US012764188B2

(12) United States Patent
Baptist et al.

(10) Patent No.: US 12,764,188 B2
(45) Date of Patent: Oct. 13, 2026

(54) SYSTEMS AND METHODS FOR ROUTING AROUND NETWORK PARTITIONS IN CONSENSUS REPLICATION

(71) Applicant: Cockroach Labs, Inc., New York, NY (US)

(72) Inventors: Andrew Baptist, Bryn Mawr, PA (US); Erik Grinaker, Oslo (NO); Nathan J. VanBenschoten, Brooklyn, NY (US)

(73) Assignee: Cockroach Labs, Inc., New York, NY (US)

( * ) Notice: Subject to any disclaimer, the term of this patent is extended or adjusted under 35 U.S.C. 154(b) by 29 days.

(21) Appl. No.: 19/009,562

(22) Filed: Jan. 3, 2025

(65) Prior Publication Data

US 2026/0197365 A1 Jul. 9, 2026

(51) Int. Cl.

*H04L 67/10* (2022.01)
*H04L 67/1095* (2022.01)
*H04L 67/1097* (2022.01)

(52) U.S. Cl.

CPC ...... *H04L 67/1097* (2013.01); *H04L 67/1095* (2013.01)

(58) Field of Classification Search

None

See application file for complete search history.

(56) References Cited

U.S. PATENT DOCUMENTS

2017/0187819 A1* 6/2017 Aizman .................. H04L 12/18

OTHER PUBLICATIONS

Weaveworks. Github. Retrieved from the Internet: <https://github.com/weaveworks/weave/blob/master/site/overview/features.md>, 7 pages, (2017).

Kubernetes Service Mesh: A Comparison of Istio, Linkerd and Consul. Platform9. Retrieved from the Internet: <https://platform9.com/blog/kubernetes-service-mesh/>, 20 pages (2019).

Alfatafta, et al., Toward a Generic Fault Tolerance Technique for Partial Network Partitioning, osdi20, (2020).

* cited by examiner

*Primary Examiner* — Cai Y Chen

(74) *Attorney, Agent, or Firm* — Goodwin Procter LLP

(57) ABSTRACT

Systems and methods for routing a request around a network partition are provided. A gateway computing device of a plurality of computing devices receives a request directed to reading from or writing to a range stored by the plurality of computing devices, where at least three replicas of the range are stored by the plurality of computing devices. The gateway computing device identifies a leaseholder computing device as storing a leaseholder replica of the replicas, the leaseholder computing device being different from the gateway computing device and being configured to coordinate operations directed to the range. The gateway computing device identifies a network partition exists between the gateway computing device and the leaseholder computing device and sends the request to the leaseholder computing device via a proxy computing device of the plurality of computing devices, with the leaseholder computing device being configured to cause execution of the request.

20 Claims, 6 Drawing Sheets

100

SYSTEMS AND METHODS FOR ROUTING AROUND NETWORK PARTITIONS IN CONSENSUS REPLICATION

FIELD OF TECHNOLOGY

The present disclosure relates generally to methods and systems for mitigating network partitions within a distributed system and more particularly, to routing requests around network partitions within a distributed system.

BACKGROUND

In some cases, relational databases can apply replication to ensure data survivability, where data is replicated among one or more computing devices ("nodes") of a group of computing devices ("cluster") configured to operate as that function as a single distributed database server. A relational database may store the data within one or more ranges, such that a range can include one or more key-value (KV) pairs and can be replicated among one or more nodes of the cluster. A range may be a partition of a data table ("table"), where a table may include one or more ranges. The database may receive and process requests (e.g., such as read or write requests originating from client devices) directed to data and/or schema objects stored by the database, thereby allowing for reading from and modification of the data and/or schema objects.

For data survivability purposes and failure tolerance, ranges can be replicated among nodes of the cluster as a number of replicas. Commonly, the database can replicate each of the ranges into at least three replicas stored among at least three distinct nodes, with the at least three replicas participating in a distributed consensus protocol to commit write operations to the range. As an example, a quorum (e.g., majority) of replicas of a range can be required to agree to commit write operations to the range for the write operations to be committed to the database. For write operations, write requests are initially received from a client device at a gateway node of the cluster via one or more networks, with the gateway node sending a received write request directed to data of a particular range to the leaseholder node storing the leaseholder replica of the range. The leaseholder node can then send the write request to the leader replica of the range for execution using distributed consensus, or execute the write request using distributed consensus directly when the leaseholder replica is also configured as the leader replica for the range. For read operations, read requests are initially received from a client device at a gateway node of the cluster, with the gateway node sending a received read request directed to data of a particular range to the leaseholder node storing the leaseholder replica of the range (e.g., when the read request is configured to read data at a timestamp greater than a closed timestamp). The leaseholder node can then execute the read request by reading the requested data from the leaseholder replica.

Conventionally, for a particular request, the gateway node communicates directly with the leaseholder node subject to the request via one or more networks without communication with any other node of the cluster by sending the request directly to the leaseholder node for further processing. However, a network partition (e.g., a network failure) can occur such that the gateway node and leaseholder node are unable to communicate for a period of time during the network partition lasting at least until the network partition is healed. As an example, a network partition can include the one or more networks or a portion thereof by which the gateway node and the leaseholder node communicate experiencing an outage or a failure. In such instances, the gateway node conventionally has no ability to directly communicate with the leaseholder node to coordinate execution of requests directed to the data of the leaseholder replica's range, thereby stalling and preventing execution of such requests for the period of time the network partition exists. Such instances are problematic in that the gateway node may retry sending the request to the leaseholder node, but the request will fail to reach the leaseholder node due to the network partition. Accordingly, the distributed system cannot conventionally process and execute the request until the network partition is resolved and healed with the gateway node being able to communicate directly with the leaseholder node via the one or more networks.

To remedy the network partition and allow for execution of the request directed to the data of the leaseholder replica's range, individuals (e.g., system administrators) are conventionally required to deactivate either of the leaseholder node or the gateway node, such that the leaseholder replica can migrate to another node within the distributed system or the client device can communicate with another, different gateway node that can communicate directly with the leaseholder node, respectively. However, such a solution (i) is time-consuming due to requiring manual intervention to deactivate either of the nodes and (ii) propagates disruption in the distributed system because deactivation of either of the nodes can result in replicas of the targeted range and of other ranges stored by the deactivated nodes to be made unavailable for a period of time while the replicas migrate for storage on other nodes of the distributed system. Accordingly, improved systems and methods for routing requests around network partitions between gateway and leaseholder nodes are desired that can maintain system availability and operability in the event of network partitions and avoid the need for manual intervention to allow for execution of the requests impacted by the network partitions.

The foregoing examples of the related art and limitations therewith are intended to be illustrative and not exclusive, and are not admitted to be "prior art." Other limitations of the related art will become apparent to those of skill in the art upon a reading of the specification and a study of the drawings.

SUMMARY

Methods and systems for routing requests around network partitions within a distributed system are disclosed. In one aspect, embodiments of the present disclosure feature a method for routing a request around a network partition in a distributed database. According to one embodiment, the method can include receiving, from a client device by a gateway computing device (i.e., gateway node) of a plurality of computing devices (i.e., nodes), a request directed to reading from or writing to a range stored by the plurality of computing devices, wherein at least three replicas of the range are stored by the plurality of computing devices, the at least three replicas being configured to participate in a consensus protocol to commit write operations to the range. The method can include identifying, by the gateway computing device and based on the request and first leaseholder information available to (e.g., stored by) the gateway computing device, a leaseholder computing device (i.e., leaseholder node) of the plurality of computing devices that is identified by the first leaseholder information as storing a leaseholder replica of the at least three replicas, the leaseholder computing device being different from the gateway computing device and being configured to (i) coordinate read operations directed to the range and (ii) coordinate the write operations directed to the range. The method can include identifying a first network partition exists between the gateway computing device and the leaseholder computing device (e.g., using heartbeat messages). The method can include sending, in response to identifying the first network partition, the request from the gateway computing device to the leaseholder computing device via a proxy computing device (i.e., proxy node) of the plurality of computing devices identified by the first leaseholder information as storing a replica of the at least three replicas, wherein the leaseholder computing device can be configured to (i) cause execution of the request and (ii) generate and send a response for the request to the gateway computing device via the proxy computing device when the leaseholder computing device stores the leaseholder replica.

Various embodiments of the method can include one or more of the following features. In some variations, a table comprises one or more ranges comprising the range and (ii) the range comprises key-value (KV) data. The gateway computing device can first receive the request from the client device via one or more networks before any other computing device of the plurality of computing devices. In some variations, the method can further include receiving, from the client device by the gateway computing device, a transaction comprising one or more requests comprising the request. Each replica of the at least three replicas of the range can be stored by a different computing device of the plurality of computing devices. In some variations, the method can further include evaluating the request to determine the request is directed to reading from or writing to the range, and identifying, from the first leaseholder information, respective computing devices of the plurality of computing devices storing the at least three replicas of the range. In some variations, the method can further include determining a closeness of each of the respective computing devices of the plurality of computing devices storing the at least three replicas of the range to the gateway computing device, and identifying, based on the first leaseholder information, the proxy computing device as being the closest of the respective computing devices storing the at least three replicas of the range to the gateway computing device. In some variations, the closeness of each of the respective computing devices of the plurality of computing devices storing the at least three replicas of the range to the gateway computing device is defined by at least one of a geographic proximity and a latency.

In some embodiments, identifying the first network partition exists between the gateway computing device and the leaseholder computing device can further include identifying, by the gateway computing device, the first network partition exists between the gateway computing device and the leaseholder computing device by identifying a failure to receive two or more consecutive heartbeat messages from the leaseholder computing device. In some variations, sending the request from the gateway computing device to the leaseholder computing device via the proxy computing device can further include generating and sending, by the gateway computing device in response to identifying the network partition, a proxy request to the proxy computing device of the plurality of computing devices storing a first replica of the plurality of replicas that is different from the leaseholder replica, the proxy request comprising the request and a proxy indicator identifying the leaseholder computing device, wherein the proxy computing device can be configured to: receive and evaluate the proxy request by comparing the proxy indicator with second leaseholder information available to the proxy computing device, and determine, based on the comparison of the proxy indicator with the second leaseholder information, the leaseholder computing device stores the leaseholder replica. In some variations, the proxy computing device can be configured to generate and send, based on the comparison of the proxy indicator with the second leaseholder information, the request to the leaseholder computing device, wherein the leaseholder computing device can be configured to (i) cause execution of the request in response to receiving the request and (ii) generate and send the response for the request to the gateway computing device via the proxy computing device in response to causing execution of the request.

In some embodiments, the system can include corresponding computer systems (e.g., servers), apparatus, and computer programs recorded on one or more computer storage devices, each configured to perform the actions of a method. A system of one or more computers can be configured to perform particular actions by virtue of having software, firmware, hardware, or a combination of them installed on the system (e.g., instructions stored in one or more storage devices) that in operation causes or cause the system to perform the actions. One or more computer programs can be configured to perform particular actions by virtue of including instructions that, when executed by data processing apparatus, cause the apparatus to perform the actions.

In another aspect, embodiments of the present disclosure feature a system (e.g., gateway computing device) for routing a request around a network partition in a distributed database. According to one embodiment, the system can include a processor; and a memory storing instructions that, when executed by the processor, configure the system to perform a number of operations. The operations can include receiving, from a client device, a request directed to reading from or writing to a range stored by a plurality of computing devices, wherein at least three replicas of the range are stored by the plurality of computing devices, the at least three replicas being configured to participate in a consensus protocol to commit write operations to the range. The operations can include identifying, based on the request and first leaseholder information, a leaseholder computing device of the plurality of computing devices that is identified by the first leaseholder information as storing a leaseholder replica of the at least three replicas, the leaseholder computing device being different from the system and being configured to (i) coordinate read operations directed to the range and (ii) coordinate the write operations directed to the range. The operations can include identifying a first network partition exists between the system and the leaseholder computing device. The operations can include sending, in response to identifying the first network partition, the request to the leaseholder computing device via a proxy computing device of the plurality of computing devices identified by the first leaseholder information as storing a replica of the at least three replicas, wherein the leaseholder computing device is configured to (i) cause execution of the request and (ii) generate and send a response for the request to the system via the proxy computing device when the leaseholder computing device stores the leaseholder replica.

Various embodiments of the system can include one or more of the following features. In some variations, the system can first receive the request from the client device via one or more networks before any computing device of the plurality of computing devices, and the operations can further include receiving, from the client device, a transaction comprising one or more requests comprising the request. Each replica of the at least three replicas of the range can be stored by a different computing device of the plurality of computing devices. The operations can further include evaluating the request to determine the request is directed to reading from or writing to the range, and identifying, from the first leaseholder information, respective computing devices of the plurality of computing devices storing the at least three replicas of the range. The operations can further include determining a closeness of each of the respective computing devices of the plurality of computing devices storing the at least three replicas of the range to the system, and identifying, based on the first leaseholder information, the proxy computing device as being the closest of the respective computing devices storing the at least three replicas of the range to the system. In some variations, the closeness of each of the respective computing devices of the plurality of computing devices storing the at least three replicas of the range to the system is defined by at least one of a geographic proximity and a latency.

In some embodiments, identifying the first network partition exists between the system and the leaseholder computing device can further include identifying the first network partition exists between the system and the leaseholder computing device by identifying a failure to receive two or more consecutive heartbeat messages from the leaseholder computing device. In some variations, sending the request to the leaseholder computing device via the proxy computing device can further include generating and sending, in response to identifying the network partition, a proxy request to the proxy computing device of the plurality of computing devices storing a first replica of the plurality of replicas that is different from the leaseholder replica, the proxy request comprising the request and a proxy indicator identifying the leaseholder computing device, wherein the proxy computing device can be configured to: receive and evaluate the proxy request by comparing the proxy indicator with second leaseholder information available to the proxy computing device, and determine, based on the comparison of the proxy indicator with the second leaseholder information, the leaseholder computing device stores the leaseholder replica. In some variations, the proxy computing device can be configured to generate and send, based on the comparison of the proxy indicator with the second leaseholder information, the request to the leaseholder computing device, wherein the leaseholder computing device can be configured to (i) cause execution of the request in response to receiving the request and (ii) generate and send the response for the request to the system via the proxy computing device in response to causing execution of the request.

The above and other preferred features, including various novel details of implementation and combination of events, will now be more particularly described with reference to the accompanying figures and pointed out in the claims. It will be understood that the particular methods and systems described herein are shown by way of illustration only and not as limitations. As will be understood by those skilled in the art, the principles and features described herein may be employed in various and numerous embodiments without departing from the scope of the present disclosure. As can be appreciated from foregoing and following description, each and every feature described herein, and each and every combination of two or more such features, is included within the scope of the present disclosure provided that the features included in such a combination are not mutually inconsistent. In addition, any feature or combination of features may be specifically excluded from any embodiment of the present disclosure.

The foregoing Summary, including the description of some embodiments, motivations therefore, and/or advantages thereof, is intended to assist the reader in understanding the present disclosure, and does not in any way limit the scope of any of the claims.

BRIEF DESCRIPTION OF THE DRAWINGS

The accompanying figures, which are included as part of the present specification, illustrate the presently preferred embodiments and together with the generally description given above and the detailed description of the preferred embodiments given below serve to explain and teach the principles described herein.

Figure 1:
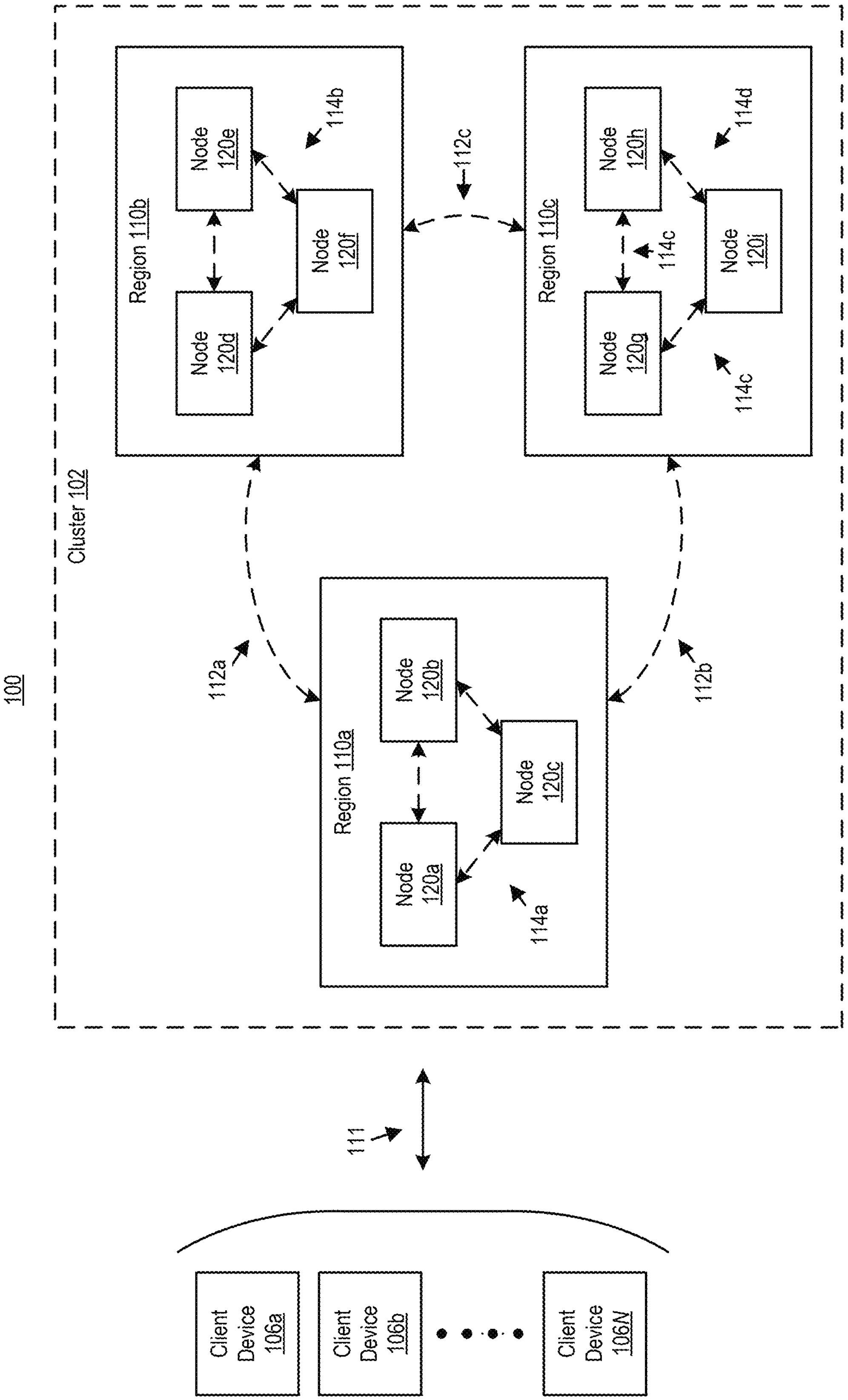
FIG. 1 ("FIG. 1") shows an illustrative distributed computing system, according to some embodiments.

While the present disclosure is subject to various modifications and alternative forms, specific embodiments thereof have been shown by way of example in the drawings and will herein be described in detail. The present disclosure should be understood to not be limited to the particular forms disclosed, but on the contrary, the intention is to cover all modifications, equivalents, and alternatives falling within the spirit and scope of the present disclosure.

DETAILED DESCRIPTION

Methods and systems for routing requests around network partitions within a distributed system are disclosed. It will be appreciated that for simplicity and clarity of illustration, where considered appropriate, reference numerals may be repeated among the figures to indicate corresponding or analogous elements. In addition, numerous specific details are set forth in order to provide a thorough understanding of the example embodiments described herein. However, it will be understood by those of ordinary skill in the art that the example embodiments described herein may be practiced without these specific details.

Motivation for Some Embodiments

In some embodiments, as described herein, a database stored by a cluster of nodes may store data (e.g., KV data) within a number of ranges. The ranges of the database can be replicated among a number of replicas stored on respective nodes, with the replicas providing survivability of the range in the event of a failure of any of the nodes and optimized accessibility based on the geographical placement of the replicas relative to the client devices accessing the range. A client device in communication with the cluster can read from and write to the replicas of a range by sending requests (e.g., read and/or write requests included in transaction(s)) to a gateway node, with the gateway node being in communication with other nodes of the cluster storing replicas of the range. As an example, based on a received request, the gateway node may identify the range(s) to which the request is directed and can send the request to the leaseholder node(s) storing the leaseholder replica(s) of the range(s) to be read from and/or written to by the request. Conventionally, the gateway node communicates directly with the leaseholder node(s) via one or more networks without any other nodes of the cluster operating as an intermediary or proxy between the gateway node and the leaseholder node(s). However, a network partition can occur between the gateway node and the leaseholder node(s), such that the gateway node is unable to directly send request(s) to the leaseholder node(s) and receive response(s) via one or more networks. Accordingly, the network partition conventionally stalls and prevents execution of requests received by the gateway node and directed to range(s) having leaseholder replica(s) stored by the leaseholder node(s) requests for the period of time the network partition exists, with solutions ranging from waiting indefinitely for the network partition to resolve to deactivating a node on either side of the network partition.

To remedy the deficiencies associated with operation of the cluster in the event of network partitions between gateway nodes and leaseholder nodes with which the gateway nodes can be required to communicate to execute requests, improved methods and systems are introduced that can (i) detect a network partition between a gateway node and a leaseholder node with which the gateway node attempts to communicate to execute a request directed to a range and (ii) route the request around the network partition using a proxy node of the cluster storing a replica of the range as an intermediary for communication between the gateway node and the leaseholder node. Based on routing the request to the leaseholder node around the network partition, the leaseholder node can proceed to process and execute the request for read and/or write operations. Accordingly, the improved methods and systems described herein avoid the need for manual intervention to deactivate the gateway node or the leaseholder node, thereby improving system reliability and autonomy. Further, the improved methods and systems can reduce latencies for processing and executing requests, as a gateway node no longer wait for a network partition to resolve and heal to send a request to a leaseholder node for execution.

Terms

"Cluster" generally refers to a deployment of computing devices that comprise a database. A cluster may include computing devices (e.g., computing nodes) that are located in one or more geographic locations (e.g., data centers). The one or more geographic locations may be located within a single geographic region (e.g., eastern United States, central United States, etc.) or more than one geographic location. For example, a cluster may include computing devices that are located in both the eastern United States and western United States, with 2 data centers in the eastern United States and 4 data centers in the western United States.

"Node" or "computing node" generally refers to an individual computing device (e.g., server) that is a part of a cluster. A node may join with one or more other nodes to form a cluster. One or more nodes that comprise a cluster may store data (e.g., tables, indexes, etc.) in a map of KV pairs. A node may store a "range", which can be a subset of the KV pairs (or all of the KV pairs depending on the size of the range) stored by the cluster. A range may also be referred to as a "shard", a "tablet", and/or a "partition.". A table and its secondary indexes can be mapped to one or more ranges, such that each KV pair in a range may represent a single row in the table (which can also be referred to as the primary index based on the table being sorted by the primary key) or a single row in a secondary index. Based on a range reaching or exceeding a threshold storage size, the range may split into two ranges. For example, based on reaching 512 mebibytes (MiB) in size, the range may be split into two ranges. Successive ranges may split into one or more ranges based on reaching or exceeding a threshold storage size.

"Index" generally refers to a copy of the rows corresponding to a single table, where the rows are sorted by one or more columns (e.g., a column or a set of columns) of the table. Each index may correspond and/or otherwise belong to a single table. In some cases, an index may include a type. An example of a first type of index may be a primary index. A primary index may be an index on row-identifying primary key columns. A primary key constraint may be applied to one or more columns of a table to uniquely identify each row of the table, such that the primary key adds structure to table data. For a column configured with a primary key constraint, values stored in the column(s) must uniquely identify each row. One or more columns of a table may be configured with a primary key constraint and the database that includes the table may automatically create an index (referred to as a "primary index") for the primary key column(s). A primary key may be defined for each table stored by a database as described herein. An example of a second type of index may be a "secondary index". A secondary index may be defined on non-primary key columns of a table. A table that does not include a defined primary index may include a hidden row identifier (ID) (e.g., referred to as rowid) column that uniquely identifies each row of the table as an implicit primary index.

"Replica" generally refers to a copy of a range. A range may be replicated at least a threshold number of times to produce a number of replicas. For example and by default, a range may be replicated three times as three distinct replicas. Each replica of a range may be stored on a distinct node of a cluster. For example, three replicas of a range may each be stored on a different node of a cluster, with no node of the cluster storing more than one replica of a particular range. In some cases, a range may be required to be replicated a minimum of three times to produce at least three replicas. In some cases, ranges may be replicated based on data survivability preferences as described further in U.S. patent application Ser. No. 17/978,752, filed on Nov. 1, 2022, and published as U.S. Patent Application Publication No. 2023/0145054 on May 11, 2023, and in U.S. patent application Ser. No. 18/365,888, filed on Aug. 4, 2023, and published as U.S. Patent Application Publication No. 2024/0045887 on Feb. 8, 2024, which are hereby incorporated by reference herein in their entireties.

"Leaseholder" or "leaseholder replica" generally refers to a replica of a range that is configured to hold the lease for the replicas of the range. The leaseholder may receive and/or coordinate read requests and write requests directed to one or more KV pairs stored by the range. "Leaseholder node" may generally refer to the node of the cluster that stores the leaseholder replica. The leaseholder may receive read requests of read transactions and may serve the read requests to transaction coordinators operating on gateway nodes that received the read transactions by providing read KVs to the transaction coordinators, such that the transaction coordinators can send the read KVs to client devices from which the read transactions originate. Other replicas of the range that are not the leaseholder may receive read requests and may send (e.g., route) the read requests to the leaseholder, such that the leaseholder can serve the read requests based on the read transaction. The leaseholder may receive write requests of write transactions and may route the write requests to the leader replica of the range for execution via distributed consensus. The leaseholder may be assigned as the leaseholder for a period of time among the replicas of the range, and can change replicas as described herein.

"Raft group" or "consensus group" generally refers to a group of the replicas for a particular range. The consensus group may only include voting replicas (e.g., leader and follower replicas) for the range and the consensus group may participate in a distributed consensus protocol and include operations as described herein.

"Raft leader" or "leader" generally refers to a replica of the range that is a leader for managing write transactions for a range. The leader receives write requests included in write transactions directed to the range from the leaseholder for the range (e.g., unless the leaseholder and leader are the same replica) coordinates execution of the write requests among the consensus group. In some cases, the leader and the leaseholder are the same replica for a range (e.g., leader is inclusive of leaseholder and/or leaseholder is inclusive of leader). In other cases, the leader and the leaseholder are not the same replica for a range. "Raft leader node" or "leader node" generally refers to a node of the cluster that stores the leader. The leader may determine that a threshold number of the replicas of a range agree to commit a write transaction prior to committing the write transaction. In some cases, the threshold number of the replicas of the range may be a majority (i.e., quorum) of the replicas of the range.

"Follower" or "follower replica" generally refers to a voting replica of the range that is not the leader. "Follower node" may generally refer to a node of the cluster that stores the follower replica. Follower replicas may receive write requests corresponding to transactions from the leader replica. The leader replica and the follower replicas of a range may constitute voting replicas that participate in a distributed consensus protocol and included operations (also referred to as "Raft protocol" and "Raft operations") as described herein.

"Raft log" and "write log" generally refers to a time-ordered log of log entries indicative of write requests (e.g., included in transactions) to a range, where the log of log entries indicate write requests and the included updates to a state of the range agreed to by at least a threshold number of the replicas of the range. Each replica of a range may include a Raft log stored on the node that stores the replica. A Raft log for a replica may be stored on persistent storage (e.g., non-volatile storage such as disk storage, solid state drive (SSD) storage, etc.). A Raft log may be a source of truth for replication among nodes for a range. Each log entry included in the Raft log may be ordered based on a timestamp at which the log entry was added to the Raft log, such that application order of the updates to each replica is the same for each replica of the range.

"Consistency" generally refers to causality and the ordering of transactions within a distributed system. Consistency defines rules for operations within the distributed system, such that data stored by the system will remain consistent with respect to read and write requests originating from different sources.

"Consensus" generally refers to a threshold number of replicas for a range, based on receiving a write transaction, acknowledging a write transaction. In some cases, the threshold number of replicas may be a majority of replicas for a range. Consensus may be achieved even if one or more nodes storing replicas of a range are offline, such that the threshold number of replicas for the range can acknowledge the write request of a write transaction. Based on achieving consensus, data modified by write request of the write transaction may be stored within the range(s) targeted by the write transaction.

"Replication" generally refers to creating and distributing copies (e.g., replicas) of the data stored by the cluster. In some cases, replication can ensure that replicas of a range remain consistent among the nodes that each comprise a replica of the range. In some cases, replication may be synchronous such that write transactions are acknowledged and/or otherwise propagated to a threshold number of replicas of a range before being considered committed to the range.

Database Overview

A database stored by a cluster of nodes may operate based on one or more remote procedure calls (RPCs). The database may be comprised of a KV store distributed among the nodes of the cluster. In some cases, the RPCs may be structured query language (SQL) RPCs. In other cases, RPCs based on other programming languages may be used. Nodes of the cluster may receive SQL RPCs from client devices. After receiving SQL RPCs, nodes may convert the SQL RPCs into operations (e.g., requests) that may operate on the distributed KV store.

In some embodiments, as described herein, the KV store of the database may be comprised of one or more ranges. A range may have a selected maximum storage size. For example, a range may have a maximum size of 512 MiB. Each range may be replicated to more than one node to maintain data survivability. For example, each range may be replicated to at least three nodes. By replicating each range to more than one node, if a node fails, replica(s) of the range would still exist on and be available on other nodes such that the range can still be accessed by client devices and replicated to other nodes of the cluster.

In some embodiments, operations directed to KV data as described herein may be executed by one or more transactions. In some cases, a node may receive a read transaction including at least one read request from a client device. A node may receive a write transaction including at least one write request from a client device. In some cases, a node can receive a read transaction or a write transaction from another node of the cluster. For example, a leaseholder node may receive a read transaction from a gateway node that originally received the read transaction from a client device. In some cases, a node can send a read transaction to another node of the cluster. For example, a node that received a read transaction, but cannot serve the read transaction may send the read transaction to the leaseholder node. In some cases, when a node receives a read transaction or write transaction that it cannot directly serve, the node may send and/or otherwise route the transaction to the node that can serve the transaction.

In some embodiments, modifications to the data of a range may rely on a consensus protocol (e.g., a Raft protocol) to ensure a threshold number of replicas of the range agree to commit the change. The threshold number of replicas may be a majority number of the replicas of the range. The consensus protocol may enable consistent reads of data stored by a range.

In some embodiments, data may be written to and/or read from a storage device of a node using a storage engine that tracks the timestamp associated with the data. By tracking the timestamp associated with the data, client devices may query for historical data from a specific period of time (e.g., at a specific timestamp). A timestamp associated with a key corresponding to KV data may be assigned by a gateway node that received the transaction that wrote and/or otherwise modified the key. For a transaction that wrote and/or modified the respective key, the gateway node (e.g., the node that initially receives a transaction) may determine and assign a timestamp to the transaction based on time of a clock of the node (e.g., at the timestamp indicated by the clock when the transaction was received by the gateway node). The transaction may assign the timestamp to the KVs that are subject to (e.g., modified by) the transaction. Timestamps may enable tracking of versions of KVs (e.g., through multi-version concurrency control (MVCC) as to be described herein) and may provide guaranteed transactional isolation. In some cases, additional or alternative methods may be used to assign versions and/or timestamps to keys and respective values.

In some embodiments, a "table descriptor" may correspond to each table of the database, where the table descriptor may contain the schema of the table and may include information associated with the table. Each table descriptor may be stored in a "descriptor table", where each version of a table descriptor may be accessed by nodes of a cluster. In some cases, a "descriptor" may correspond to any suitable schema or subset of a schema, where the descriptor may contain the schema or the subset of the schema and may include information associated with the schema (e.g., a state of the schema). Examples of a descriptor may include a table descriptor, type descriptor, database descriptor, and schema descriptor. A view and/or a sequence as described herein may correspond to a table descriptor. Each descriptor may be stored by nodes of a cluster in a normalized or a denormalized form. Each descriptor may be stored in a KV store by nodes of a cluster. In some embodiments, the contents of a descriptor may be encoded as rows in a database (e.g., SQL database) stored by nodes of a cluster. Descriptions for a table descriptor corresponding to a table may be adapted for any suitable descriptor corresponding to any suitable schema (e.g., user-defined schema) or schema element as described herein. In some cases, a database descriptor of a database may include indications of a primary region and one or more other database regions configured for the database.

In some embodiments, a database architecture for the cluster of nodes may include one or more layers. The one or more layers may process received SQL RPCs into actionable processes to access, modify, store, and return data to client devices, while providing for data replication and consistency among nodes of a cluster. The layers may include one or more of: a SQL layer, a transactional layer, a distribution layer, a replication layer, and a storage layer.

In some cases, the SQL layer of the database architecture exposes a SQL application programming interface (API) to developers and converts high-level SQL statements into low-level read and write requests to the underlying KV store, which are passed to the transaction layer. The transaction layer of the database architecture can implement support for atomic, consistent, isolated, and durable (ACID) transactions by coordinating concurrent operations. The distribution layer of the database architecture can provide a unified view of a cluster's data. The replication layer of the database architecture can copy data between nodes and ensure consistency between these copies by implementing a consensus protocol (e.g., consensus algorithm). The storage layer may commit writes from the Raft log to disk storage (e.g., a non-volatile, persistent computer-readable storage medium on a node), as well as return requested data (e.g., read data) to the replication layer.

In some embodiments, the transaction layer may enable ACID semantics for transactions within the database. The transaction layer may receive binary KV operations from the SQL layer and control KV operations sent to a distribution layer. In some cases, a storage layer of the database may use MVCC to maintain multiple versions of keys and values mapped to the keys stored in ranges of the cluster. For example, each key stored in a range may have a stored MVCC history including respective versions of the key, values for the versions of the key, and/or timestamps at which the respective versions were written and/or committed. Each version of a particular key may have a different timestamp, such that no two versions of the same key can have the same timestamp.

Transaction Layer

In some embodiments, the database architecture for a database stored by a cluster (e.g., cluster 102) of nodes may include a transaction layer. The transaction layer may enable ACID semantics for transactions operating on data and schemas within the database. The transaction layer may receive binary KV operations from the SQL layer and control KV operations sent to a distribution layer. In some cases, a storage layer of the database may use MVCC to maintain multiple versions of keys and values mapped to the keys stored in ranges of the cluster. For example, each key stored in a range may have a stored MVCC history including respective versions of the key, values for the versions of the key, and/or timestamps at which the respective versions were written and/or committed. Each version of a key may have a different timestamp, such that no versions of the key can have the same timestamp.

In some embodiments, for write transactions, the transaction layer may generate one or more locks. A lock may represent a provisional, uncommitted state for a particular value of a KV pair. The lock may be written as part of a write request of the write transaction. The database architecture described herein may include multiple lock types. In some cases, the transactional layer may generate unreplicated locks, which may be stored in an in-memory lock table (e.g., stored by volatile, non-persistent storage of a node) that is specific to the node storing the replica on which the write transaction executes. An unreplicated lock may not be replicated other replicas based on a consensus protocol as described herein. In other cases, the transactional layer may generate one or more replicated locks (referred to as "intents" or "write intents"). An intent may be a persistent, provisional value written by a transaction before the transaction commits that is stored in persistent storage (e.g., non-volatile storage such as disk storage, SSD storage, etc.) of nodes of the cluster. Each KV write operation performed by a transaction can initially be an intent, which includes a provisional version and a reference to the transaction's corresponding transaction record. An intent may differ from a committed value by including a pointer to a transaction record of a transaction that wrote the intent. In some cases, the intent functions as an exclusive lock on the KV data of the replica stored on the node on which the write request of the write transaction executes, thereby preventing conflicting read and write requests having timestamps greater than or equal to a timestamp corresponding to the intent (e.g., the timestamp assigned to the transaction when the intent was written). An intent may be replicated to other nodes of the cluster storing a replica of the range based on the consensus protocol as described herein. An intent for a particular key may be included in an MVCC history corresponding to the key, such that a reader of the key can distinguish the intent from other versions of committed MVCC values stored in persistent storage for the key.

In some embodiments, each transaction directed to the cluster may have a unique replicated KV pair (referred to as a "transaction record") stored on a range stored by the cluster. The transaction for a record may be added and stored in a replica of a range on which a first write request of the write transaction occurs. The transaction record for a particular transaction may store metadata corresponding to the transaction. The metadata may include an indication of a status of a transaction and a unique identifier (ID) corresponding to the transaction. The status of a transaction may be one of: "pending" (also referred to as "PENDING"), staging (also referred to as "STAGING"), "committed" (also referred to as "COMMITTED"), or "aborted" (also referred to as "ABORTED") as described herein. A pending state may indicate that the transaction is in progress. A staging state may be used to enable a parallel commit protocol. A committed state may indicate that the transaction has committed and the write intents written by the transaction have been recorded by follower replicas. An aborted state may indicate the write transaction has been aborted and the values (e.g., values written to the range) associated with the write transaction may be discarded and/or otherwise dropped from the range. As write intents are generated by the transaction layer as a part of one or more write requests of a write transaction, the transaction layer may check for newer (e.g., more recent) committed values at the KVs of the range on which the write transaction is operating. If newer committed values exist at the KVs of the range, the write transaction may be restarted. Alternatively, if the write transaction identifies write intents at the KVs of the range, the write transaction may proceed as a transaction conflict as to be described herein. The transaction record may be addressable using the transaction's unique ID, such that requests can query and read a transaction's record using the transaction's ID.

In some embodiments, for read transactions, the transaction layer may execute a read transaction for KVs of a range indicated by the read transaction. The transaction layer may execute the read transaction if the read transaction is not aborted. The read transaction may read MVCC values at the KVs of the range. Alternatively, the read transaction may read intents written at the KVs, such that the read transaction may proceed as a transaction conflict as to be described herein.

In some embodiments, to commit a write transaction, the transaction layer may determine the transaction record of the write transaction as it executes. The transaction layer may restart the write transaction based on determining the state of the write transaction indicated by the transaction record is aborted. Alternatively, the transaction layer may determine the transaction record to indicate the state as pending or staging. Based on the transaction record indicating the write transaction is in a pending state, the transaction layer may set the transaction record to staging and determine whether the write intents of the write transaction have succeeded (e.g., succeeded by replication to the other nodes storing replicas of the range). If the write intents have succeeded, the transaction layer may report the commit of the transaction to the transaction coordinator operating at the gateway node. The gateway node may send an indication of a successful commit of the write transaction to the client device that initiated the write transaction.

In some embodiments, based on committing a write transaction, the transaction layer may cleanup the committed write transaction. A coordinating node to which the write transaction was directed may cleanup the committed write transaction via the transaction layer. A coordinating node may be a node that stores a replica of a range that is the subject of the transaction. In some cases, a coordinating node may be the gateway node for the transaction. The coordinating node may track a record of the KVs that were the subject of the write transaction. To clean up the transaction, the coordinating node may modify the state of the transaction record for the write transaction from staging to committed. In some cases, the coordinating node may resolve the write intents written for new versions of keys by the write transaction to MVCC (e.g., committed) values by removing the pointer to the transaction record. In some cases, the coordinating node may resolve the write intents written for new versions of keys by the write transaction to MVCC (e.g., committed) values using time bound iteration to filter and avoid reading keys having timestamps less than a target timestamp or external to a target timestamp range, thereby reducing an amount of time required to resolve the write intents. Based on removing the pointer to the transaction record for the write transaction, the coordinating node may delete the write intents of the transaction. Based on the deletion of each of the write intents for the transaction, the transaction record may be deleted. Additional features for a commit protocol are described at least in U.S. patent application Ser. No. 18/316,851, filed on May 12, 2023, and published as U.S. Patent Application Publication No. 2024/0378191 on Nov. 14, 2024, which is hereby incorporated by reference herein in its entirety.

In some embodiments, the transaction layer may track timing of transactions (e.g., to maintain serializability). The transaction layer may implement hardware logical clocks (HLCs) to track time within the cluster. An HLC may be composed of a physical component (e.g., which may be close to local actual time) and a logical component (e.g., which is used to distinguish between events with the same physical component). HLC time may always be greater than or be equal to the actual time. Each node may include a local HLC, such that the cluster operates based on locally distributed clocks operating at individual nodes.

For a transaction having a per-transaction read snapshot scope, the gateway node (e.g., the node that initially receives a transaction from a client device) may determine a timestamp for the transaction and constituent requests (e.g., requests derived from a transaction) based on an HLC time for the node. For example, the gateway node may determine and assign a timestamp for the transaction to be equal to an HLC time of the gateway node at which the gateway node received the transaction. For a transaction having a per-statement read snapshot scope, the gateway node (e.g., the node that initially receives a transaction) may determine a timestamp for each received statement of the transaction and constituent requests of each statement based on an HLC time for the node. For example, the gateway node may determine a timestamp for a statement of the transaction to be equal to an HLC time of the gateway node at which the gateway received the statement of the transaction. The transaction layer may enable transaction timestamps based on HLC time. A timestamp within the cluster may be used to track versions of KVs (e.g., through MVCC as to be described herein) and provide guaranteed transactional isolation. A timestamp for a write intent as described herein may be equal to the assigned timestamp of a transaction corresponding to the write intent when the write intent was written to storage. A timestamp for a write intent corresponding to a transaction may be less than or equal to a commit timestamp for a transaction. When a timestamp for a write intent is less than a commit timestamp for the transaction that wrote the write intent (e.g., based on advancing the commit timestamp due to a transaction conflict or a most-recent timestamp indicated by a timestamp data structure), during asynchronous intent resolution, the committed, MVCC version of the write intent may have its respective timestamp advanced to be equal to the commit timestamp of the transaction.

For a transaction, for a node sending a request for the transaction to another node, the node may include the timestamp for the request that was generated by the local HLC (e.g., the HLC of the node) with the sent request. Based on receiving a request from another node (e.g., sender node), a node (e.g., receiver node) may inform the local HLC of the timestamp supplied with the transaction by the sender node. In some cases, the receiver node may update the local HLC of the receiver node with the timestamp included in the received transaction. Such a process may ensure that all data read and/or written to a node has a timestamp less than the HLC time at the node. Accordingly, the leaseholder for a range may serve read requests for data stored by the leaseholder, where the read requests of the read transaction that reads the data having an HLC timestamp greater than or equal to the HLC timestamp of the MVCC value read by the read transaction (e.g., such that the read occurs after the write).

To provide isolation within the cluster, based on a request of a transaction reading a value of a range via a read request, the transaction layer may store the request's timestamp in a timestamp data structure (e.g., timestamp cache) stored at the leaseholder replica of the range. For each read request directed to a range, the timestamp cache may record and include an indication of the latest timestamp (e.g., the timestamp that is the furthest ahead in time) at which value(s) of the range that were read by a read request of a transaction. Based on execution of a write transaction, the transaction layer may compare the timestamp of the write transaction to the latest timestamp indicated by the timestamp cache. If the timestamp of the write transaction is less than the latest timestamp indicated by the timestamp cache, the transaction layer may attempt to advance the timestamp of the write transaction forward to a new, later timestamp that is greater than the latest timestamp indicated by the timestamp cache. In some cases, advancing the timestamp may cause the write transaction to restart in the second phase of the transaction as to be described herein with respect to read refreshing.

In some embodiments, according to replication (e.g., database, table, index, etc.) zone configurations, non-voting replicas may be placed in database regions that do not include a voting replica. To reduce latencies in a multi-region database, non-voting (e.g., follower) replicas may be made available to serve historical (e.g., stale) read requests originating from client devices located within their respective database region, such that read requests may be routed from a gateway node to a local follower node for a respective range and do not need to be directed to the leaseholder node for the respective range. A historical (e.g., stale) read request may include a read timestamp that is sufficiently in the past (e.g., such that write transactions have completed propagating to non-voting replicas). Accordingly, follower reads may be consistent reads at historical (e.g., stale) timestamps from non-leaseholder replicas of a range, which may be enabled by closed timestamp updates. A closed timestamp update may be a data store-wide timestamp, where the timestamp can include per-range information indicative of Raft (e.g., consensus) progress among a leader replica (e.g., typically the leaseholder replica) and follower (e.g., voting) replicas. A leader node for a range may send (e.g., periodically) a closed timestamp update to one or more follower nodes storing replicas of the range, where the closed timestamp update includes a closed timestamp indicative of the time at which the range was most recently updated and/or otherwise modified according to the consensus (e.g., Raft) protocol. Based on received closed timestamp updates, a follower node storing a follower replica for range may have the necessary information to serve consistent, non-stale reads for read requests directed to the range having read timestamps that are less than or equivalent to the received closed timestamp from the leader replica and serve stale reads for read requests directed to the range having timestamps that are above the received closed timestamp. Accordingly, in some embodiments, follower nodes storing follower replicas for a range may serve read requests when follower reads are enabled. For ranges configured as non-blocking ranges, follower replicas may serve consistent reads at a present time based on receiving a closed timestamp update with a synthetic timestamp. Examples of applications of closed timestamp updates, follower reads, and non-blocking transactions can be found in at least U.S. patent application Ser. No. 17/371,403, filed on Jul. 9, 2021, now issued as U.S. Pat. No. 11,860,860 on Jan. 2, 2024, which is hereby incorporated by reference in its entirety.

As described herein, the SQL layer may convert SQL statements (e.g., received from client devices) to KV operations. KV operations generated from the SQL layer may use a Client Transaction (CT) transactional interface of the transaction layer to interact with the KVs stored by the cluster. The CT transactional interface may include a transaction coordinator. The transaction coordinator may perform one or more operations as a part of the transaction layer. Based on the execution of a transaction, the transaction coordinator may send (e.g., periodically send) “heartbeat” messages to a transaction record for the transaction. These messages may indicate that the transaction should keep executing (e.g., be kept alive). If the transaction coordinator fails to send the “heartbeat” messages, the transaction layer may modify the transaction record for the transaction to an aborted status. The transaction coordinator may track each written KV and/or written span of KVs during execution of a transaction. In some embodiments, the transaction coordinator may clean and/or otherwise clear accumulated transaction operations. The transaction coordinator may clear an accumulated write intent for a write transaction based on the status of the transaction changing to committed or aborted.

As described herein, to track the status of a transaction during execution, the transaction layer can write to a transaction record corresponding to the transaction. Write intents of the transaction may route conflicting transactions to the transaction record based on the pointer to the transaction record included in the write intents, such that the conflicting transaction may determine a status for conflicting write intents as indicated in the transaction record. The transaction layer may write a transaction record to the same range as the first key subject to a transaction. The transaction coordinator may track the first key subject to a transaction. In some cases, the transaction layer may generate the transaction record when one of the following occurs: the write request commits; the transaction coordinator sends heartbeat messages for the transaction; or a request forces the transaction to abort. As described herein, a transaction record may have one of the following states: pending, committed, staging, or aborted. In some cases, the transaction record may not exist. If a transaction encounters a write intent where a transaction record corresponding to the write intent does not exist, the transaction may use the timestamp of the write intent to determine how to proceed with respect to the observed write intent. If the timestamp of the write intent is within a transaction liveness threshold, the write intent may be treated as pending. If the timestamp of the write intent is not within the transaction liveness threshold, the write intent may be treated as aborted. A transaction liveness threshold may be a duration configured based on a time period for sending "heartbeat" messages. For example, the transaction liveness threshold may be a duration lasting for five "heartbeat" message time periods, such that after five missed heartbeat messages, a transaction may be aborted. The transaction record for a committed transaction may remain until each of the write intents of the transaction are converted to committed MVCC values stored on persistent storage of a node.

As described herein, in the transaction layer, values may not be written directly to the storage layer as committed MVCC values during a write transaction. Values may be written in a provisional (e.g., uncommitted) state referred to as a write intent. Write intents may be MVCC values including a pointer to a transaction record to which the MVCC value belongs. Based on interacting with a write intent (instead of a committed MVCC value), a request may determine the status of the transaction record, such that the request may determine how to interpret the write intent. As described herein, if a transaction record is not found for a write intent, the request may determine the timestamp of the write intent to evaluate whether or not the write intent may be considered to be expired.

In some embodiments, the transaction layer may include a concurrency manager for concurrency control. The concurrency manager may sequence incoming requests (e.g., from transactions) and may provide isolation between the transactions that issued those requests that intend to perform conflicting operations. This activity may be referred to as concurrency control. The concurrency manager may combine the operations of a latch manager and a lock table to accomplish this work. The latch manager may sequence the incoming requests and may provide isolation between those requests. The lock table may provide locking and sequencing of requests (in combination with the latch manager). The lock table may be a per-node, in-memory (e.g., stored by volatile, non-persistent storage) data structure. The lock table may hold a collection of locks acquired by transactions that are in-progress as to be described herein.

As described herein, the concurrency manager may be a structure that sequences incoming requests and provides isolation between the transactions that issued those requests, where the requests intend to perform conflicting operations. During sequencing, the concurrency manager may identify conflicts. The concurrency manager may resolve conflicts based on passive queuing and/or active pushing. Once a request has been sequenced by the concurrency manager, the request may execute (e.g., without other conflicting requests) based on the isolation provided by the concurrency manager. This isolation may last for the duration of the request. The isolation may terminate based on (e.g., after) completion of the request. Each request in a transaction may be isolated from other requests. Each request may be isolated during the duration of the request, after the request has completed (e.g., based on the request acquiring locks), and/or within the duration of the transaction comprising the request. The concurrency manager may allow transactional requests (e.g., requests originating from statements of transactions) to acquire locks, where the locks may exist for durations longer than the duration of the requests themselves. The locks may extend the duration of the isolation provided over specific keys of ranges stored by the cluster to the duration of the transaction. The locks may be released when the transaction commits or aborts. Other requests that encounter and/or otherwise interact with the locks (e.g., while being sequenced) may wait in a queue for the locks to be released. Based on the locks being released, the other requests may proceed to execute. The concurrency manager may include information for external locks (e.g., the write intents).

In some embodiments, one or more locks may not be controlled by the concurrency manager, such that one or more locks may not be discovered during sequencing. As an example, write intents (e.g., replicated, exclusive locks) may be stored such that they may not be detected until request evaluation time. In most embodiments, fairness may be ensured between requests, such that if any two requests conflict, the request that arrived first will be sequenced first. Sequencing may guarantee first-in, first-out (FIFO) semantics. An exception to FIFO semantics is that a request that is part of a transaction which has already acquired a lock may not need to wait on that lock during sequencing. The request may disregard any queue that has formed on the lock. Lock tables as to be described herein may include one or more other exceptions to the FIFO semantics described herein.

In some embodiments, as described herein, a lock table may be a per-node, in-memory data structure. The lock table may store a collection of locks acquired by in-progress transactions. Each lock in the lock table may have an associated lock wait-queue. Conflicting transactions can queue in the associated lock wait-queue based on waiting for the lock to be released. Items in the locally stored lock wait-queue may be propagated as necessary (e.g., via RPC) to an existing Transaction Wait Queue (TWQ). The TWQ may be stored on the leader replica of the range, where the leader replica on which the first write request of a transaction occurred may contain the transaction record.

As described herein, databases stored by the cluster may be read and written using one or more "requests." A transaction may be composed of one or more statements (e.g., SQL statements), where each statement includes one or more requests, such as read requests and write requests. A read request may be a request to read data stored by a range, such as a value of a particular key at a timestamp corresponding to the request. A write request may be a request to write (e.g., update or modify) data stored by a range, such that the write request writes a value for a key included in the range. For example, a write request may write a value for a new version of a key. Isolation may be needed to separate requests. Additionally, isolation may be needed to separate transactions. Isolation for requests and/or transactions may be accomplished by maintaining multiple versions and/or by allowing requests to acquire locks. Isolation based on multiple versions may require a form of mutual exclusion, such that a read and a conflicting lock acquisition do not occur concurrently. The lock table may provide locking and/or sequencing of requests (in combination with the use of latches).

In some embodiments, locks may last for a longer duration than the requests associated with the locks. Locks may extend the duration of the isolation provided over specific KVs to the duration of the transaction associated with the lock. As described herein, locks may be released when the transaction commits or aborts. Other requests that encounter and/or otherwise interact with the locks (e.g., while being sequenced) may wait in a queue for the locks to be released. Based on the locks being released, the other requests may proceed. In some embodiments, the lock table may enable fairness between requests, such that if two requests conflict, then the request that arrived first may be sequenced first. In some cases, there may be exceptions to the FIFO semantics as described herein. A request that is part of a transaction that has acquired a lock may not need to wait on that lock during sequencing, such that the request may ignore a queue that has formed on the lock. In some embodiments, contending requests that encounter different levels of contention may be sequenced in a non-FIFO order. Such sequencing in a non-FIFO order may enable greater concurrency. As an example, if requests $R_1$ and $R_2$ contend on key $K_2$, but $R_1$ is also waiting at key $K_1$, $R_2$ may be determined to have priority over $R_1$, such that $R_2$ may be executed on $K_2$.

In some embodiments, as described herein, a latch manager may sequence incoming requests and may provide isolation between those requests. The latch manager may sequence and provide isolation to requests under the supervision of the concurrency manager. A latch manager may operate as follows. As write requests occur for a range, a leaseholder of the range may receive and serialize write requests for the range. Serializing the requests may group the requests into a consistent order. To enforce the serialization, the leaseholder may create a "latch" for the keys in the write value, such that a write request may be given uncontested access to the keys. If other requests access the leaseholder for the same set of keys as the previous write request, the other requests may wait for the latch to be released before proceeding. In some cases, read requests may generate latches. Multiple read latches over the same keys may be held concurrently. A read latch and a write latch over the same keys may not be held concurrently.

In some embodiments, the transaction layer may execute transactions at a serializable transaction isolation level. A serializable isolation level may not prevent anomalies in data stored by the cluster. A serializable isolation level may be enforced by requiring the client device to retry transactions if serializability violations are possible. In some embodiments, the transaction layer may execute transactions at an isolation level different from a serializable isolation level. In some cases, the transaction layer may execute transactions at other isolation levels, such as a read committed isolation level and a snapshot isolation level.

In some embodiments, the transaction layer may allow for one or more transaction conflict types, where a conflict type may result from a transaction encountering and/or otherwise interacting with a write intent at a key (e.g., at least one key). A write/write conflict may occur when two concurrent transactions attempt to write to (e.g., create write intents for) the same key. A write/read conflict may occur when a read request of a transaction encounters an existing write intent with a timestamp less than or equal to the timestamp of the read request. To resolve the transaction conflict, the transaction layer may proceed through one or more operations. Based on a transaction within the transaction conflict having a defined transaction priority (e.g., high priority, low priority, etc.), the transaction layer may abort the transaction with lower priority (e.g., in a write/write conflict) or advance the timestamp of the transaction having a lower priority (e.g., in a write/read conflict). Based on a transaction within the conflicting transactions being expired, the expired transaction may be aborted. A transaction may be considered to be expired if the transaction does not have a transaction record or the timestamp for the transaction is outside of the transaction liveness threshold. A transaction may be considered to be expired if the transaction record corresponding to the transaction has not received a "heartbeat" message from the transaction coordinator within the transaction liveness threshold. A transaction (e.g., a low priority transaction) that is required to wait on a conflicting transaction may enter the TWQ as described herein.

In some embodiments, the transaction layer may allow for one or more additional conflict types that do not involve write intents. A read/write conflict (also referred to herein as a "write after read conflict") may occur when a write transaction having a lower timestamp conflicts with a read transaction having an equal or higher timestamp. The timestamp of the write transaction may be advanced to be greater than the timestamp of the read transaction, such that the write transaction may execute. A read within an uncertainty interval (also referred to as an "uncertainty window") may occur when a read transaction encounters a KV having a higher timestamp than the timestamp of the read transaction and there exists ambiguity whether the KV should be considered to be committed in the future or in the past of the read transaction. An uncertainty interval may be configured based on the maximum allowed offset (e.g., maximum allowed difference in time) between the clocks (e.g., HLCs) of any two nodes within the cluster. In an example, a duration of the uncertainty interval may be equal to the maximum allowed offset, where the uncertainty interval is defined as (t, t+d], where t refers to the initial timestamp of the read transaction and d refers to the duration of the uncertainty interval. A read within an uncertainty interval may occur based on clock skew between clocks operating on different nodes. In some cases, the transaction layer may advance the timestamp of the read transaction to be greater than the timestamp of the KV according to read refreshing as described herein. If the read transaction associated with a read within an uncertainty interval has to be aborted and retried, the read transaction may never encounter an uncertainty interval on any node which was previously visited by the read transaction. In some cases, there may not exist an uncertainty interval for KVs read from the gateway node of the read transaction. An amount of work to be aborted and retried may depend on a read snapshot scope and corresponding isolation level for a transaction. A first transaction that adheres to an isolation level having a per-statement read snapshot scope may only be required to abort and retry an individual statement of the first transaction while a second transaction that adheres to an isolation level having a per-transaction read snapshot scope may be required to abort and retry all statements of the transaction. When a first transaction adheres to an isolation level having a per-statement read snapshot scope, an amount of work aborted and retried by the first transaction may be relatively less work than a second transaction that adheres to an isolation level having a per-transaction read snapshot scope.

In some embodiments, as described herein, the TWQ may track all transactions that could not advance another blocking, ongoing transaction that wrote write intents observed by the tracked transactions. The transactions tracked by the TWQ may be queued and may wait for the blocking transaction to complete before the transaction can proceed to execute. The structure of the TWQ may map a blocking transaction to the one or more other transactions that are blocked by the blocking transaction via the respective unique IDs corresponding to each of the transactions. The TWQ may operate on the leader replica of a range, where the leader replica includes the transaction record based on being subject to the first write request included in the blocking, ongoing transaction. Based on a blocking transaction resolving (e.g., by committing or aborting), an indication may be sent to the TWQ that indicates the queued transactions blocked by the blocking transaction may begin to execute. A blocked transaction (e.g., a transaction blocked by a blocking transaction) may examine their transaction status to determine whether they are active. If the transaction status for the blocked transaction indicates the blocked transaction is aborted, the blocked transaction may be removed by the transaction layer. In some cases, deadlock may occur between transactions, where a first transaction may be blocked by second write intents of a second transaction and the second transaction may be blocked by first write intents of the first transaction. If transactions are deadlocked (e.g., blocked on write intents of another transaction), one of the deadlocked transactions may randomly abort, such that the remaining, active (e.g., alive) transaction may execute and the deadlock may be removed. A deadlock detection mechanism may identify whether transactions are deadlocked and may cause one of the deadlocked transactions to abort.

In some embodiments, the transaction layer may enable read refreshing. When a timestamp of a transaction has been advanced to a new, later timestamp, additional considerations may be required before the transaction may commit at the advanced timestamp. The considerations may include checking KVs previously read by the transaction to verify that other write transactions have not occurred at the KVs between the original transaction timestamp and the advanced transaction timestamp. This consideration may prevent serializability violations. The check may be executed by tracking each read using a Refresh Request (RR). If the check succeeds (e.g., write transactions have not occurred between the original transaction timestamp and the advanced transaction timestamp), the transaction may be allowed to commit at the advanced timestamp. A transaction may perform the check at a commit time if the transaction was advanced by a different transaction or by the timestamp cache. A transaction may perform the check based on encountering a read within an uncertainty interval or a write/write conflict. If the check is unsuccessful, then the transaction may be retried at the advanced timestamp.

In some embodiments, the transaction layer may enable transaction pipelining. Write transactions may be pipelined when being replicated to follower replicas and when being written to storage. Transaction pipelining may reduce the latency of transactions that perform multiple writes. In transaction pipelining, write intents may be replicated from leader replicas (e.g., combined leaseholder and leader replicas) to follower replicas in parallel, such that waiting for a commit occurs at transaction commit time. Transaction pipelining may include one or more operations. In transaction pipelining, for each received statement (e.g., including one or more requests) of a transaction, the gateway node corresponding to the transaction may communicate with the leaseholders ($L_1, L_2, L_3, \ldots, L_i$) for the range(s) indicated by the transaction. Each leaseholder $L_i$ may receive the communication from the gateway node and may perform one or more operations in parallel. Each leaseholder $L_i$ may cause the respective leader replica for the range(s) to (i) create write intents, and (ii) send the write intents to corresponding follower nodes for the leader replica. After sending the write intents to the corresponding follower nodes, each leader replica may cause the respective leaseholder $L_i$ to send an indication to the transaction coordinator on the gateway node that the write intents have been sent. Replication of the intents may be referred to as "in-flight" once the leader replica sends the write intents to the follower replicas. Before committing the transaction (e.g., by updating the transaction record for the transaction via a transaction coordinator), the gateway node may wait for the write intents to be replicated in parallel to each of the follower nodes of the leader nodes. Based on receiving responses from the leader nodes and leaseholder nodes that the write intents have propagated to the follower nodes, the gateway node may commit the transaction by causing an update to the status of the transaction record of the transaction. Additional features of distributed consensus (e.g., Raft) operations are described with respect to "Transaction Execution."

Replication Layer

In some embodiments, the database architecture for the cluster may include a replication layer. The replication layer may copy data (e.g., ranges) between nodes of the cluster and enable consistency between the copied data based on a consensus protocol as described herein. The replication layer may allow the cluster to tolerate a subset of nodes going offline and/or otherwise being unavailable, such that the range data stored by the cluster is still available to client devices. The replication layer may receive requests from the distribution layer (e.g., from the DistSender as described herein). The replication layer may send responses (e.g., Batch Responses) to the distribution layer (e.g., the DistSender). In the replication layer, if the node receiving a request is the leaseholder for the range, the node may accept the request. If the node receiving a request is not the leaseholder for the range, the node may return an error to the source of the request, where the error may include an indication of a pointer to the leaseholder (or node last known to be the leaseholder) based on lease information available to the node. The KV requests may be converted to Raft commands. The replication layer may write accepted requests to a storage layer as to be described herein. Committed Raft commands may be written to the Raft log and stored on a storage medium of a node via the storage layer. The leaseholder may serve reads from the storage layer.

In some embodiments, the replication layer may apply a consensus protocol. The consensus protocol may require a threshold number (e.g., a quorum or a majority) of replicas of a range to confirm a modification (e.g., a write transaction) to the range prior to committing the modification. Based on the consensus protocol, the replication layer may require at least 3 nodes to include a replica of a range, such that a threshold number of replicas may agree to a modification to the range. In some cases, if the threshold number of replicas required to confirm a modification is a majority of the replicas, the replication layer may enable the database to tolerate a number of node failures as described by Equation 1:

$$\text{Tolerable Node Failures} = \frac{\text{Replication Factor} - 1}{2} \quad (1)$$

As described in Equation 1, a "Replication Factor" may be a number of replicas of a range stored by the cluster. For example, based on a "Replication Factor" equal to five nodes, the replication layer may tolerate node failure for two nodes of a cluster, where the failed nodes each store a replica of a range and three other nodes that are online and available store replicas of the range. In some cases, the "Replication Factor" may be configured at the cluster, database, and/or table level, where a cluster may store one or more databases and a database may include one or more ranges distributed among the nodes of the cluster.

In some embodiments, as described herein, the replication layer may include a consensus protocol (referred to as Raft). Raft may be an algorithm (e.g., distributed consensus algorithm) that stores data among one or more nodes of the cluster, such that the nodes may approve of the state of the data based on reaching consensus. Raft may organize the nodes storing a replica of a range in a group referred to as a Raft group as described herein. Each replica of a Raft group may be classified as a leader replica or a follower replica as described herein. The leader replica may coordinate writes to the follower replicas of the Raft group. The leader replica may send "heartbeat" messages to the follower replicas (e.g., periodically). The leader replica may be elected by follower replicas as to be described herein. Based on the absence of "heartbeat" messages from the leader replica, follower replicas may become candidates for the leader replica. Based on receiving a Batch Request for a range, a node may convert the KV operations indicated by the Batch Request into one or more Raft commands. The node may send the Raft commands to the Raft leader (e.g., if the node that received the Batch Request is not the leader replica). Based on receiving the Raft commands, the leader node may write the Raft commands to the Raft log as to be described herein.

In some embodiments, based on a threshold (e.g., a majority) of nodes writing a transaction and the writes being committed by the leader replica, the writes may be appended to the Raft log as described herein. The Raft log may be an ordered set of commands agreed on by a threshold number of replicas of the range. The Raft log may be a source of truth for consistent replication among nodes of the cluster. In some cases, each replica can be "snapshotted", such that a copy of the data stored by the replica may be generated for a specific applied log index. This copy of the data (e.g., a snapshot) may be sent to other nodes during a rebalance event to enable and/or expedite replication. A rebalance event may update data stored by a node to a specific log index based on the snapshot. Based on loading the snapshot, a node may be updated based on executing operations (e.g., indicated by the Raft log) that have occurred since the snapshot was taken.

In some embodiments, as described herein, a single node in the Raft group may be configured as the leaseholder node. The leaseholder node may be the only node that can serve reads to a client device or propose writes to the Raft leader node (e.g., both actions may be received as Batch Requests from DistSender as described herein with respect to "Distribution Layer"). When serving reads, the leaseholder may bypass the Raft protocol. The leaseholder may bypass the Raft protocol based on the consensus previously achieved for the values stored by the range. In most embodiments, the leaseholder and the leader replica may be the same replica stored on a node of the range, such that write requests may be proposed directly to the leaseholder/leader replica. The replication layer may attempt to collocate the leaseholder and leader replica during each lease renewal or transfer. If a leaseholder is not configured for a range, any node receiving a request may send a request to become the leaseholder for the range. The request may be sent to each node storing a replica of the range, with the nodes voting to reach consensus for the node to become the leaseholder. A node that sends a request to become the leaseholder may include a copy of the last valid lease stored by the node. If the last valid lease is equivalent to the current configured leaseholder, the request may be granted by a replica in response to receiving the request. Alternatively, if the last valid lease is not equivalent to the current configured leaseholder, the request may be ignored and/or otherwise denied by a replica.

In some embodiments, to manage leases for ranges included in tables as table data, the replication layer may use "epochs." An epoch may be a period between a node joining a cluster and a node disconnecting from a cluster. To extend a lease (e.g., to remain leaseholder for a particular range), a leaseholder node must periodically update a liveness record corresponding to the node. The liveness record may be stored on a system range key by one or more nodes of the cluster. Based on disconnecting from the cluster, a node may fail to update the liveness record. An epoch may be considered to be changed based on a node disconnecting from the cluster and/or failing to update the liveness record, at which point any node storing a replica of the range may become the leaseholder for the range as described herein. The replication layer may cause a leaseholder node to lose the lease for a range based on the leaseholder node disconnecting from the cluster. In some cases, a leaseholder may not be required to renew a lease for a range. The leaseholder may lose the lease for a range based on disconnecting from the cluster. In some cases, additional or alternative techniques may be used to assign a leaseholder for a range.

In some embodiments, as described herein, meta ranges and/or system ranges may be stored as KV data. System ranges may be restricted from epoch-based leases. System ranges may use expiration-based leases. An expiration-based lease may expire at (or substantially close to) a timestamp. In some cases, a leaseholder for a system range may retain the expiration-based lease after the timestamp at which the expiration-based lease was configured to expire. The leaseholder for the system range may retain the expiration-based lease based on the leaseholder continuing to generate and/or otherwise propose Raft commands to a Raft group.

In some embodiments, the replication layer may enable leaseholder rebalancing. Each leaseholder for a cluster may consider (e.g., periodically consider) whether to transfer the lease to another replica of the range. In an example, a leaseholder may periodically determine whether to transfer the lease to another replica of the range every 10 minutes. Each leaseholder may be configured to transfer the lease for a range based on the number of requests from each locality (e.g., region) for the range, the number of leases on each node comprising the range, and/or the latency between localities. If replicas for a range are distributed among different localities, the replication layer may determine which replica of the cluster is optimized to be the leaseholder. In some cases, a replica may be suited to be the leaseholder based on providing the lowest latency to requests from client devices.

For leaseholder rebalancing, a leaseholder may track the number of requests received by the leaseholder from each locality of the cluster. The number of requests received by the leaseholder from each locality of the cluster may be tracked as an average (e.g., an exponentially weighted moving average). The average may determine the localities that most frequently send requests to the range. In some cases, for an exponentially weighted moving average, the locality that has recently requested the range most often may be assigned the greatest weight. Based on another locality requesting the range frequently, the moving average may cause the locality to be assigned the greatest weight.

For leaseholder rebalancing, the leaseholder may correlate each requesting locality's weight (e.g., the proportion of recent requests) to the locality of each replica by determining a similarity (e.g., similarity between country and/or region) between localities. For example, if the leaseholder received requests from gateway nodes in a region defined as the Central United States (e.g., Country=United States, Region=Central), the replication layer (or leaseholder) may assign the following weights to replicas as described in Table 1 as follows:

TABLE 1

| Replica # | Replica Locality | Replica Leaseholder Rebalancing Weight |
|---|---|---|
| 1 | Country = United States, Region = Central | 100% |
| 2 | Country = United States, Region = East | 50% |
| 3 | Country = Australia, Region = Central | 0% |

As shown in Table 1, the "Replica #" identified by 1, with a "Replica Locality" of the Central United States may be configured as 100% for "Replica Leaseholder Rebalancing Weight" based on having a match (e.g., a complete match) to the Country and the Region of the "Replica Locality". The "Replica #" identified by 2, with a "Replica Locality" of the East United States may be configured as 50% for "Replica Leaseholder Rebalancing Weight" based on having a match (e.g., a partial match) to the Country of the "Replica Locality". The "Replica #" identified by 3, with a "Replica Locality" of Central Australia may be configured as 0% for "Replica Leaseholder Rebalancing Weight" based on lacking a match with the Country and the Region of the "Replica Locality". Based on the assignment of rebalancing weights to the replicas of the range, the leaseholder may determine a rebalancing weight and latency corresponding to the leaseholder. The rebalancing weight and latency may be compared to the rebalancing weight and latency corresponding to the other replicas (e.g., as shown in Table 1) to determine an adjustment factor for each replica. In an example, the greater the disparity between weights and the larger the latency between localities, the more the replication layer may favor the node including the replica from the locality with the larger weight.

For leaseholder rebalancing, the leaseholder may evaluate each replica's rebalancing weight and adjustment factor for the localities with the largest weights. The leaseholder may transfer the lease to another replica (e.g., of the node having the largest weight and/or adjustment factor). The leaseholder may transfer the lease to the replica if transferring the lease is beneficial and/or viable.

In some embodiments, based on a change to the number of nodes of a cluster, replicas for a range may require rebalancing. The replicas may require rebalancing based on changing of the members of a Raft group (e.g., due to the change to the number of nodes of a cluster).

Rebalancing may enable optimal survivability and performance. Rebalancing may vary based on whether nodes are added to the cluster or removed from the cluster for the change to the number of nodes of the cluster. Based on nodes being added to the cluster, the added node(s) may communicate identifying information to the existing nodes of the cluster. The identifying information may include an indication that the added node(s) have available storage capacity. The cluster may rebalance replicas stored by the existing nodes to the added node(s). A node may be removed from a Raft group of a cluster based on a lack of a response to the Raft group after a period of time. In an example, the period of time may be 5 minutes. Based on nodes being removed from the cluster (e.g., due to a lack of a response to the Raft group), nodes of the cluster may rebalance data stored by the removed node(s) to the remaining nodes of the cluster. Rebalancing may be enabled based on using a snapshot of a replica from the leaseholder. The snapshot may be sent to another node (e.g., over gRPC as described herein). Based on receiving and/or replicating the snapshot, the node with a replica (e.g., a replicated replica from the snapshot) may join the Raft group of the range corresponding to the replica. The node may determine the index of the added replica to lag one or more entries (e.g., the most recent entries) in the Raft log. The node may execute the actions indicated in the Raft log to update the replica to the state indicated by the most recent index of the Raft log. In some cases, replicas may be rebalanced based on the relative load stored by the nodes within a cluster.

Storage Layer

In some embodiments, the database architecture for databases stored by a cluster (e.g., cluster 102) of database nodes may include a storage layer. The storage layer may enable the cluster to read and write data to storage device(s) of each node. As described herein, data may be stored as KV pairs on the storage device(s) using a storage engine. In some cases, the storage engine may be a Pebble storage engine. The storage layer may serve successful read transactions and write transactions from the replication layer.

In some embodiments, each node of the cluster may include at least one store, which may be specified when a node is activated and/or otherwise added to a cluster. Read transactions and write transactions may be processed from the store. Each store may contain two instances of the storage engine as described herein. A first instance of the storage engine may store temporary distributed SQL data. A second instance of the storage engine may store data other than the temporary distributed SQL data, including system data (e.g., meta ranges) and user data (e.g., table data, client data, etc.). For each node, a block cache may be shared between each store of the node. The store(s) of a node may store a collection of replicas of a range as described herein, where a particular replica may not be replicated among stores of the same node (or the same node), such that a replica may only exist once on a particular node.

In some embodiments, as described herein, the storage layer may use an embedded KV data store (e.g., Pebble). The KV data store may be used with an application programming interface (API) to read and write data to storage devices (e.g., persistent storage devices) of nodes of the cluster. The KV data store may enable atomic write batches and snapshots.

In some embodiments, the storage layer may use MVCC to enable concurrent requests. In some cases, the use of MVCC by the storage layer may guarantee consistency for the cluster. As described herein, HLC timestamps may be used to differentiate between different versions of data (e.g., KVs) by tracking commit timestamps for the data. HLC timestamps may be used to identify a garbage collection expiration for a value as to be described herein. In some cases, the storage layer may support time travel queries (e.g., queries directed to MVCC versions of keys at previous timestamps). Time travel queries may be enabled by MVCC versions of keys.

In some embodiments, the storage layer may aggregate MVCC values (e.g., garbage collect MVCC values) to reduce the storage size of the data stored by the storage (e.g., the disk) of nodes. The storage layer may compact MVCC values (e.g., old MVCC values) based on the existence of a newer MVCC value with a timestamp that is older than a garbage collection period. A garbage collection period may be configured for the cluster, database, and/or table. Garbage collection may be executed for MVCC values that are not configured with a protected timestamp. A protected timestamp subsystem may ensure safety for operations that rely on historical data. Operations that may rely on historical data may include imports, backups, streaming data using change feeds, and/or online schema changes. Protected timestamps may operate based on generation of protection records by the storage layer. Protection records may be stored in an internal system table. In an example, a long-running job (e.g., such as a backup) may protect data at a certain timestamp from being garbage collected by generating a protection record associated with that data and timestamp. Based on successful creation of a protection record, the MVCC values for the specified data at timestamps less than or equal to the protected timestamp may not be garbage collected. When the job (e.g., the backup) that generated the protection record is complete, the job may remove the protection record from the data. Based on removal of the protection record, the garbage collector may operate on the formerly protected data.

In some embodiments, a storage layer as described herein may be an embedded KV store. The storage layer may enable the cluster to read and write data to storage device(s) of each node. As described herein, data may be stored as KV pairs on the storage device(s) using a storage engine. The storage layer may provide atomic write batches and snapshots, which can indicate a subset of transactions. In some cases, the storage layer may operate a log-structured merge (LSM) tree at each node of the cluster to manage data storage, where each node stores replicas of one or more ranges of a database within the LSM tree. In some cases, other types of data storage structures, such as a B-tree, may be used in addition or in place of an LSM tree at each node.

In some cases, the LSM tree is a hierarchical tree including a number of levels. For each level of the LSM tree, one or more files may be stored on persistent storage media (e.g., disk storage, solid state drive (SSD) storage, etc.) that include the data referenced at that respective level. The files may be sorted string table (SST) files as described herein. In some cases, SST files are an on-disk (e.g., on persistent, non-volatile storage such as disk storage, SSD storage, etc.) representation of sorted lists of KV pairs. SST files can be immutable, such that they are never modified (e.g., even during a compaction process) and instead are deleted and written.

Transaction Execution

In some embodiments, as described herein, distributed transactional databases stored by the cluster (e.g., cluster 102) of database nodes may enable receipt and execution one or more transactions. Each transaction may include one or more requests directed to performing one or more operations. The one or more requests may include read requests and/or write requests. In some cases, a request may be a query (e.g., a SQL query). A request may traverse one or more nodes of a cluster to execute the request. A request may interact with (e.g., sequentially interact with) one or more of the following: a SQL client, a load balancer, a gateway node, a leaseholder node, and/or a leader node as described herein. A SQL client may send a request (e.g., query) to a cluster. The request may be included in a transaction, where the transaction is a read and/or a write transaction as described herein. A load balancer may route the request from the SQL client to the nodes of the cluster. A gateway node may be a node that initially receives the request and/or sends a response to the SQL client. A leaseholder node may be a node that serves read requests and coordinates write requests for a range of keys (e.g., keys indicated in the request) as described herein. Serving a read request may include reading, by a request, a value(s) of stored keys and sending the read values from the node on which the values were stored to the transaction coordinator for the transaction corresponding to the request, where the transaction coordinator for the transaction can operate on a gateway node that originally received the transaction (e.g., from a client device). A leader node may be a node that maintains consensus among the replicas for a range via coordination of a consensus protocol.

A SQL client (e.g., operating at a client device 106*a*) may send a request (e.g., a SQL request) to a cluster (e.g., cluster 102). The request may be sent over a network (e.g., the network 111). A load balancer may determine a particular node of the cluster to which to send the request. The node (operating as the gateway node for the client) may be a node of the cluster that is closest to the SQL client (e.g., having the lowest latency and/or having the closest geographic location) to the computing device on which the SQL client is operating. A gateway node (e.g., a node 120*a*) may receive the request from the load balancer. The gateway node may parse the request to determine whether the request is valid. The request may be valid based on conforming to the syntax (e.g., SQL syntax) of the database(s) stored by the cluster. An optimizer operating at the gateway node may generate a number of logically equivalent query plans based on the received request. Each query plan may correspond to a physical operation tree configured to be executed for the query. The optimizer may select an optimal query plan from the number of query plans (e.g., based on a cost model). Based on the completion of request planning, a query execution engine may execute the selected, optimal query plan using a transaction coordinator as described herein. In some cases, a query plan may be generated and selected as described further in U.S. patent application Ser. No. 18/090,994, filed on Nov. 29, 2022, and published as U.S. Patent Application Publication No. 2024/0220498 on Jul. 4, 2024, which is hereby incorporated by reference herein in its entirety. A transaction coordinator operating on a gateway node may perform one or more operations as a part of the transaction layer. The transaction coordinator may cause execution of KV operations on a database stored by the cluster. The transaction coordinator may account for keys indicated and/or otherwise involved in a transaction. The transaction coordinator may package KV operations into a Batch Request as described herein, where the Batch Request may be forwarded on to a Distribution Sender (DistSender) operating on the gateway node.

A DistSender of a gateway node and/or coordinating node may receive Batch Requests from a transaction coordinator of the same node. The DistSender of the gateway node may receive the Batch Request from the transaction coordinator. The DistSender may determine the operations indicated by the Batch Request and may determine the node(s) (e.g., the leaseholder node(s)) that should receive requests corresponding to the operations for the range. The DistSender may identify and determine the node(s) (e.g., the leaseholder node(s)) that should receive requests corresponding to the operations for the range based on leaseholder information available to the DistSender at the gateway node. The leaseholder information may identify, for each range stored by the cluster, the nodes storing replicas of that range, the leaseholder node storing the leaseholder replica for that range, the leader node storing the leader replica for that range, and follower nodes storing the follower replicas for that range. The leaseholder information may be current as of a particular timestamp and may be updated as the nodes storing replicas of ranges change, such as changes in leaseholder and leader replicas. In some cases, leaseholder information may become out of date when the leaseholder information does not correctly identify the particular nodes storing particular replicas of a range. A first node may receive updated leaseholder information from a second, different node of the cluster, thereby causing the first node to update its leaseholder information with the timestamp at which the leaseholder information was updated.

In some embodiments, the DistSender may generate one or more Batch Requests based on determining the operations and the node(s) as described herein. The DistSender may send a first Batch Request for each range in parallel. Based on receiving a provisional acknowledgment from a leaseholder node's evaluator, the DistSender may send the next Batch Request for the range corresponding to the provisional acknowledgement. The DistSender may wait to receive acknowledgments for write requests and values for read requests corresponding to the sent Batch Requests.

As described herein, the DistSender of the gateway node may send Batch Requests to leaseholders (or other replicas) for data indicated by the Batch Request. In some cases, the DistSender may send Batch Requests to nodes that are not the leaseholder for the range (e.g., based on out of date leaseholder information). Nodes may or may not store the replica indicated by the Batch Request. Nodes may respond to a Batch Request with one or more responses. A response may indicate the node is no longer a leaseholder for the range. The response may indicate the last known address of the leaseholder for the range. A response may indicate the node does not include a replica for the range. A response may indicate the Batch Request was successful if the node that received the Batch Request is the leaseholder. The leaseholder may process the Batch Request. As a part of processing of the Batch Request, each write request in the Batch Request may compare a timestamp of the write request to the timestamp cache. A timestamp cache may track the highest timestamp (e.g., most recent timestamp) for any read request that a given range has served. The comparison may ensure that the write request has a higher timestamp than any timestamp indicated by the timestamp cache. If a write request has a lower timestamp than any timestamp indicated by the timestamp cache, the write request may be restarted at an advanced timestamp that is greater than the value of the most recent timestamp indicated by the timestamp cache.

In some embodiments, operations indicated in the Batch Request may be serialized by a latch manager of a leaseholder node. For serialization, each write request may be given a latch on a row. Any read and/or write requests that arrive after the latch has been granted on the row may be required to wait for the write request to complete. Based on completion of the write request, the latch may be released and the subsequent requests can proceed to execute. In some cases, a batch evaluator may ensure that write requests are valid. The batch evaluator may determine whether the write request is valid based on the leaseholder node's data. The leaseholder's data may be evaluated by the batch evaluator based on the leaseholder node coordinating write requests to the range. If the batch evaluator determines the write request to be valid, the leaseholder node may send a provisional acknowledgement to the DistSender of the gateway node, such that the DistSender may begin to send subsequent Batch Requests for the range to the leaseholder.

In some embodiments, requests may read from the local instance of the storage engine as described herein to determine whether write intents are present at a key. If write intents are present at a particular key, a request may resolve write intents as described herein. If the request is a read request and write intents are not present at the key, the read request may read the value at the key of the leaseholder's storage engine. Read responses corresponding to a transaction may be aggregated into a Batch Response by the leaseholder. The Batch Response may be sent to the DistSender of the gateway node. If the request is a write request and write intents are not present at the key, the KV operations included in the Batch Request that correspond to the write request may be converted to distributed consensus (e.g., Raft) operations and write intents, such that the write request may be replicated to the replicas of the range.

With respect to a single round of distributed consensus, the leaseholder may propose the Raft operations to the leader replica of the Raft group (e.g., where the leader replica is typically also the leaseholder). Based on receiving the Raft operations, the leader replica may send the Raft operations to the follower replicas of the Raft group. Writing and/or execution of Raft operations as described herein may include writing one or more write intents to persistent storage. The leader replica and the follower replicas may attempt to write the Raft operations to their respective Raft logs. When a particular replica writes the Raft operations to its respective local Raft log, the replica may acknowledge success of the Raft operations by sending an indication of a success of writing the Raft operations to the leader replica. If a threshold number of the replicas acknowledge writing the Raft operations (e.g., the write operations) to their respective Raft log, consensus may be achieved such that the Raft operations may be committed (referred to as "consensus-committed" or "consensus-commit"). The consensus-commit may be achieved for a particular Raft operation when a majority of the replicas (e.g., including or not including the leader replica) have written the Raft operation to their local Raft log. The consensus-commit may be discovered or otherwise known to the leader replica to be committed when a majority of the replicas have sent an indication of success for the Raft operation to the leader replica. Based on a Raft operation (e.g., write operation) being consensus-committed among a Raft group, each replica included in the Raft group may apply the committed entry to their respective local state machine. Based on achieving consensus-commit among the Raft group, the Raft operations (e.g., write operations included in the write transaction) may be considered to be committed (e.g., implicitly committed). The gateway node may update the status of the transaction record for the transaction corresponding to the Raft operations to committed (e.g., explicitly committed). A latency for the above-described distributed consensus round may be equal to a duration for sending a Raft operation from the leader replica to the follower replicas, receiving success responses for the Raft operation at the leader replica from at least some of the follower replicas (e.g., such that a majority of replicas write to their respective Raft log), and writing a write intent to persistent storage at the leader and follower replicas in parallel.

In some embodiments, based on the leader replica writing the Raft operations to the Raft log and receiving an indication of the consensus-commit among the Raft group, the leader replica may send a commit acknowledgement to the DistSender of the gateway node. The DistSender of the gateway node may aggregate commit acknowledgements from each write request included in the Batch Request. In some cases, the DistSender of the gateway node may aggregate read values for each read request included in the Batch Request. Based on completion of the operations of the Batch Request, the DistSender may record the success of each transaction in a corresponding transaction record. To record the success of a transaction, the DistSender may check the timestamp cache of the range where the first request of the write transaction occurred to determine whether the timestamp for the write transaction was advanced. If the timestamp was advanced, the transaction may perform a read refresh to determine whether values associated with the transaction had changed. If the read refresh is successful (e.g., no values associated with the transaction had changed), the transaction may commit at the advanced timestamp. If the read refresh fails (e.g., at least some value associated with the transaction had changed), the transaction may be restarted. Based on determining the read refresh was successful and/or that the timestamp was not advanced for a write transaction, the DistSender may change the status of the corresponding transaction record to committed as described herein. The DistSender may send values (e.g., read values) to the transaction coordinator. The transaction coordinator may send the values to the SQL layer. In some cases, the transaction coordinator may also send a request to the DistSender, where the request includes an indication for the DistSender to convert write intents to committed values (e.g., MVCC values). The SQL layer may send the values as described herein to the SQL client that initiated the query (e.g., operating on a client device).

Database Architecture

Referring to FIG. 1, an illustrative distributed computing system 100 is presented. The computing system 100 may include a cluster 102. In some cases, the computing system may include one or more additional clusters 102 (not shown in FIG. 1). The cluster 102 may include one or more (e.g., a number of) nodes 120 distributed among one or more geographic regions 110. The geographic regions may correspond to cluster regions and database regions as described further below. A node 120 may be a computing device (e.g., a server computing device). In some cases, a node 120 may include at least portions of the computing system as described herein with respect to FIG. 5. As an example, a node 120 may be a server computing device. A node may store replicas of one or more ranges, where one or more SST files stored by the node 120 include the data (e.g., KV data) of the range. A region 110 may correspond to a particular building (e.g., a data center), city, state/province, country, geographic region, and/or a subset thereof. In some cases, each region 110 may be a distinct, non-overlapping geographic region. A region 110 may include multiple elements, such as a country and a geographic identifier for the country. For example, a region 110 may be indicated by Country=United States and Region=Central, which may indicate a region 110 as the Central United States. As shown in FIG. 1, the cluster 102 may include regions 110*a*, 110*b*, and 110*c*. In some cases, the cluster 102 may include one region 110. In an example, the region 110*a* may be the Eastern United States, the region 110*b* may be the Central United States, and the region 110*c* may be the Western United States. Each region 110 of the cluster 102 may include one or more nodes 120. In some cases, a region 110 may not include any nodes 120. The region 110*a* may include nodes 120*a*, 120*b*, and 120*c*. The region 110*b* may include the nodes 120*d*, 120*e*, and 120*f*. The region 110*c* may include nodes 120*g*, 120*h*, and 120*i*.

Each node 120 of the cluster 102 may be communicatively coupled via one or more networks 112 and 114. In some cases, the cluster 102 may include networks 112*a*, 112*b*, and 112*c*, as well as networks 114*a*, 114*b*, 114*c*, and 114*d*. The networks 112 may include a local area network (LAN), wide area network (WAN), and/or any other suitable network. In some cases, the one or more networks 112 may connect nodes 120 of different regions 110. The nodes 120 of region 110*a* may be connected to the nodes 120 of region 110*b* via a network 112*a*. The nodes 120 of region 110*a* may be connected to the nodes 120 of region 110*c* via a network 112*b*. The nodes 120 of region 110*b* may be connected to the nodes 120 of region 110*c* via a network 112*c*. The networks 114 may include a LAN, WAN, and/or any other suitable network. In some cases, the networks 114 may connect nodes 120 within a region 110. The nodes 120*a*, 120*b*, and 120*c* of the region 110*a* may be interconnected via a network 114*a*. The nodes 120*d*, 120*e*, and 120*f* of the region 110*b* may be interconnected via a network 114*b*. In some cases, the nodes 120 within a region 110 may be connected via one or more different networks 114. The node 120*g* of the region 110*c* may be connected to nodes 120*h* and 120*i* via a network 114*c*, while nodes 120*h* and 120*i* may be connected via a network 114*d*. In some cases, the nodes 120 of a region 110 may be located in different geographic locations within the region 110. For example, if region 110*a* is the Eastern United States, nodes 120*a* and 120*b* may be located in New York, while node 120*c* may be located in Massachusetts.

In some embodiments, the computing system 100 may include one or more client devices 106. The one or more client devices 106 may include one or more computing devices. In some cases, the one or more client devices 106 may each include at least portions of the computing system as described herein with respect to FIG. 5. In an example, the one or more client devices 106 may include laptop computing devices, desktop computing devices, mobile computing devices, tablet computing devices, and/or server computing device. As shown in FIG. 1, the computing system 100 may include client devices 106*a*, 106*b*, and one or more client devices 106 up to client device 106N, where N is any suitable number of client devices 106 included in the computing system 100. The client devices 106 may be communicatively coupled to the cluster 102, such that the client devices 106 may access and/or otherwise communicate with the nodes 120. One or more networks 111 may couple the client devices 106 the nodes 120. The one or more networks 111 may include a LAN, a WAN, and/or any other suitable network as described herein. As an example, the client devices 106 may communicate with the nodes 120 via a SQL client (e.g., an application) operating at each respective client device 106. To access and/or otherwise interact with the data stored by the cluster 102, a client device 106 may communicate with a gateway node, which may be a node 120 of the cluster that is closest (e.g., by latency, geographic proximity, and/or any other suitable indication of closeness) to the client device 106. The gateway node may route communications between a client device 106 and any other node 120 of the cluster. In some cases, one or more applications may operate on the client devices 106, such that the application(s) may interface with the nodes 120 to access, modify, and/or retrieve stored KV data.

Read Transaction Execution

Figure 2A:
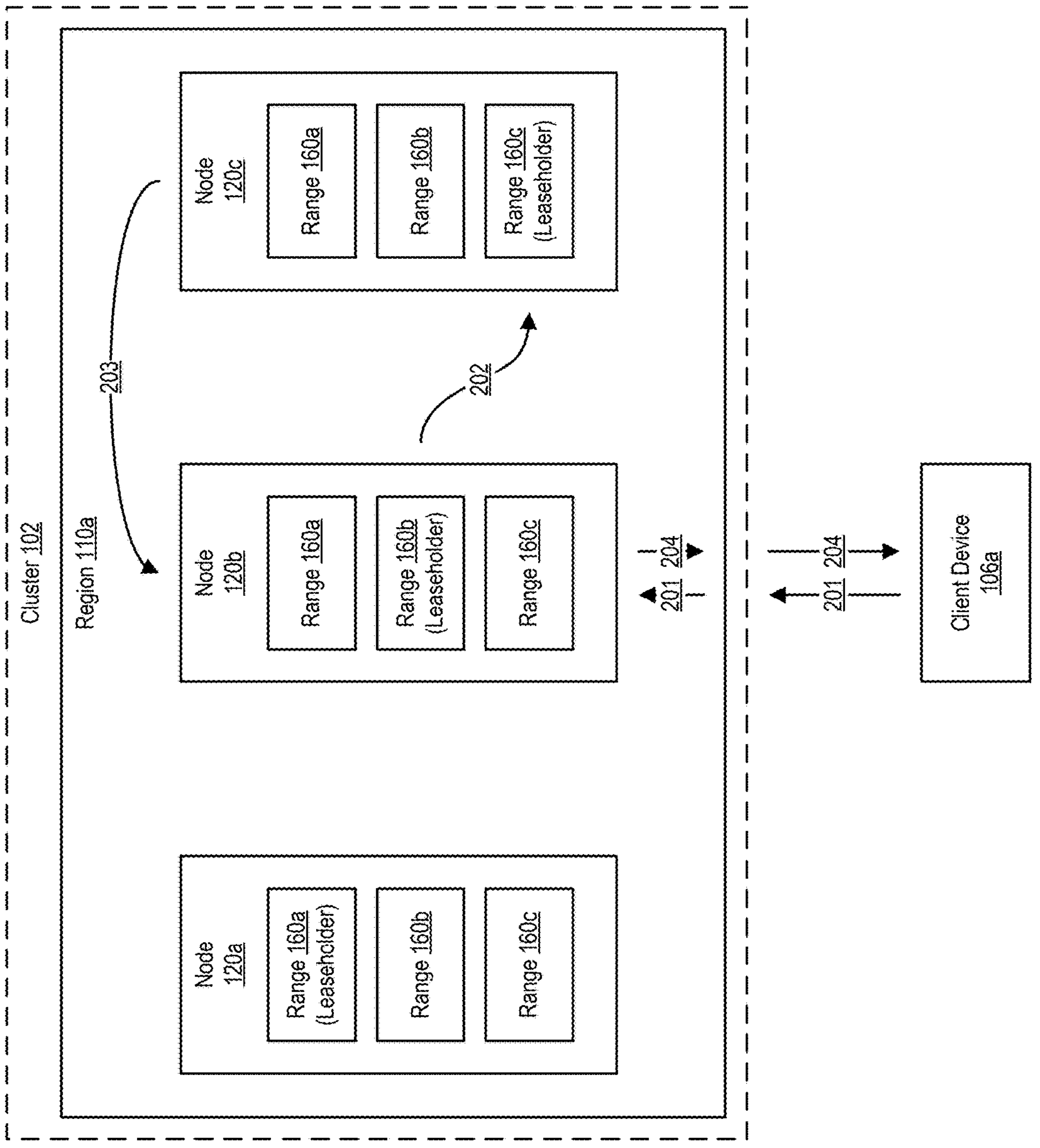
FIG. 2A shows an example of execution of a read transaction at the computing system, according to some embodiments.

Referring to FIG. 2A, an example of execution of a read transaction including at least one read request at the computing system 100 is illustrated. In some cases, the nodes 120*a*, 120*b*, and 120*c*, of the region 110*a* may include one or more replicas of the ranges 160. The node 120*a* may store and operate replicas of a first range 160*a*, a second range 160*b*, and a third range 160*c*, where each of the ranges 160*a*, 160*b*, and 160*c* are different ranges. The node 120*a* may store and operate the leaseholder replica for the range 160*a* (as indicated by "Leaseholder" in FIG. 2A). The node 120*b* may store and operate replicas of the first range 160*a*, the second range 160*b*, and the third range 160*c*. The node 120*b* may store and operate the leaseholder replica for range 160*b* (as indicated by "Leaseholder" in FIG. 2A). The node 120*c* may store and operate replicas of the first range 160*a*, the second range 160*b*, and the third 160*c*. The node 120*c* may store and operate the leaseholder replica for range 160*c* (as indicated by "Leaseholder" in FIG. 2A). While FIG. 2A is described with respect to communication between nodes 120 of a single region (e.g., region 110*a*), a read transaction may execute similarly using nodes 120 located within different geographic regions.

In some embodiments, a client device 106 may initiate a read transaction at a node 120 of the cluster 102 by sending the read transaction to the cluster 102. Based on the keys indicated by the read transaction, the node 120 that initially receives the read transaction (e.g., the gateway node) from the client device 106 may send the read request(s) of the read transaction to a node 120 storing and operating the leaseholder replica of the range 160 including the keys indicated by the read request(s). The node 120 storing and operating the leaseholder of the range 160 may receive and serve the read request(s) by reading the data subject to the read request and sending the read data to the gateway node. For example, the node 120 storing and operating the leaseholder of the range 160 may serve the read requests by reading the values of the keys subject to the read request and sending the read keys and values to the gateway node. The gateway node may receive the read data and may send the read data to the client device 106.

As shown in FIG. 2A, at step 201, the client device 106 may send a read transaction to the cluster 102. A node 120*b* functioning as the gateway node may receive the read transaction from the client device 106. The node 120*b* may be a node 120 of the cluster 102 that is located closest to the client device 106, with the closeness between the nodes 120 and the client device 106 being defined, for example, by a latency and/or a proximity as described herein. The read transaction may include at least one request directed to reading data stored by the range 160*c*. At step 202, the node 120*b* may send the read request(s) of the received read transaction to the node 120*c*. The read request(s) may be sent to the node 120*c* based on the node 120*c* being the leaseholder of the range 160*c*. The node 120*c* may receive the read request(s) from the node 120*b* and serve the read request(s) by reading data from the range 160*c*. At step 203, the node 120*c* may send the read data from the range 160*c* to the node 120*b*. The node 120*c* may send the read data to node 120*b* based on the node 120*b* being the gateway node for the read transaction. The node 120*b* may receive the read data from node 120*c*. At step 204, the node 120*b* may send the read data to the client device 106*a* to complete the read transaction. If the node 120*b* had been configured to store and operate the leaseholder for the range 160*c* in place of the node 120*c*, the node 120*b* may have served the read data to the client device 106*a* directly after step 201, without sending the read request(s) of the read transaction to the node 120*c*.

Write Transaction Execution

Figure 2B:
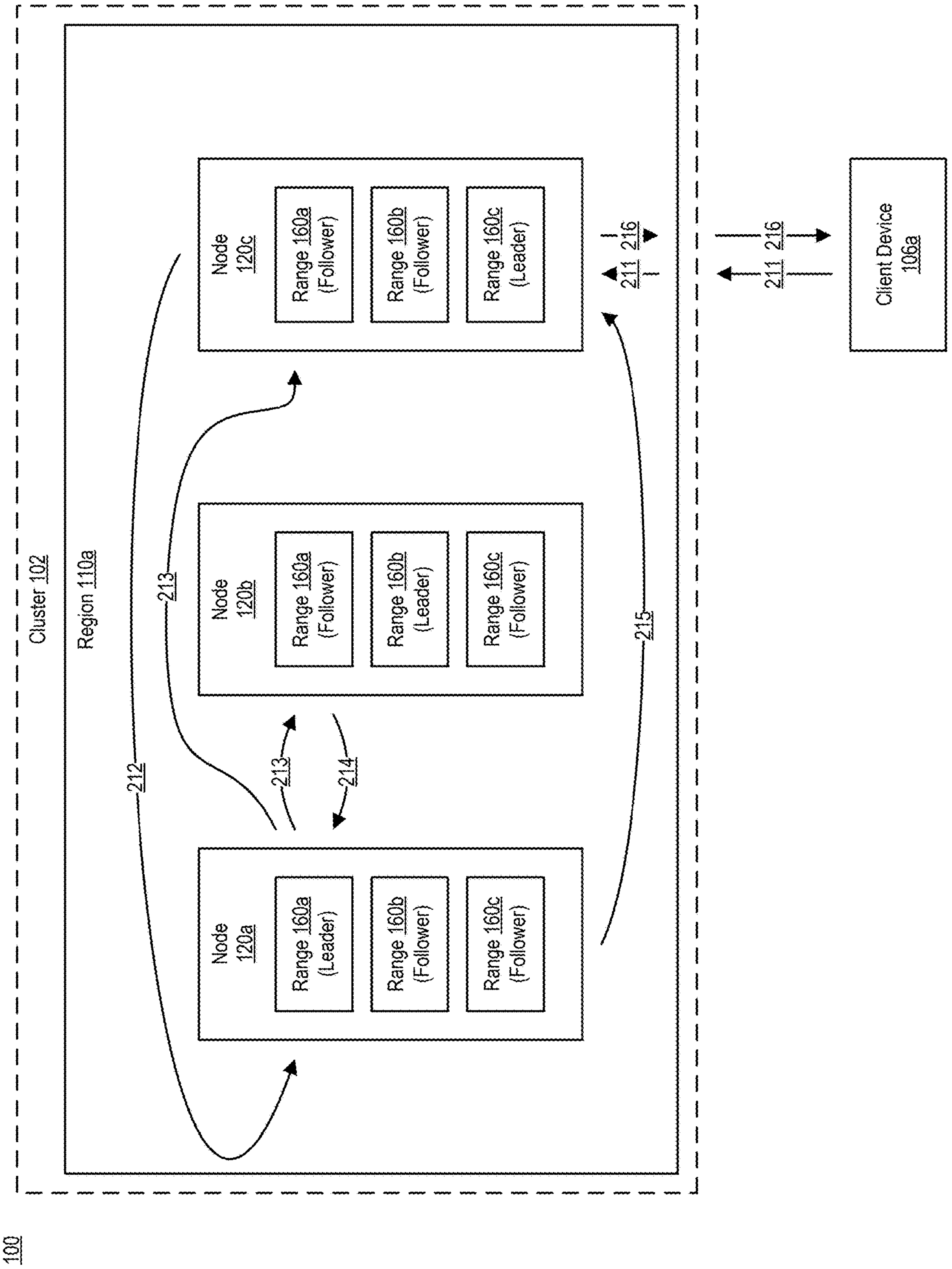
FIG. 2B shows an example of execution of a write transaction at the computing system, according to some embodiments.

Referring to FIG. 2B, an example of execution of a write transaction including at least one write request at the computing system 100 is presented. In some cases, as described herein, the nodes 120*a*, 120*b*, and 120*c*, of the region 110*a* may include one or more replicas of ranges 160. The node 120*a* may store and operate replicas of a first range 160*a*, a second range 160*b*, and a third range 160*c*, where each of the ranges 160*a*, 160*b*, and 160*c* are different ranges. The node 120*a* may store and operate the leaseholder replica and the leader replica for range 160*a* (as indicated by "Leaseholder" in FIG. 2A and "Leader" in FIG. 2B). The node 120*b* may store and operate replicas of the first range 160*a*, the second range 160*b*, and the third range 160*c*. The node 120*b* may store and operate the leader replica for range 160*b* (as indicated by "Leader" in FIG. 2B). The node 120*c* may store and operate replicas of the first range 160*a*, the second range 160*b*, and the third range 160*c*. The node 120*c* may store and operate the leader replica for range 160*c* (as indicated by "Leader" in FIG. 2B). While FIG. 2B is described with respect to communication between nodes 120 of a single region (e.g., region 110*a*), a write transaction may execute similarly using nodes 120 located within different geographic regions.

In some embodiments, a client device 106 may initiate a write transaction at a node 120 of the cluster 102 by sending the write transaction to the cluster 102, with the write transaction including at least one write request. Based on the keys indicated by the write transaction (e.g., the keys to which the write request(s) are directed), the node 120 that initially receives the write transaction (e.g., the gateway node) from the client device 106 may send the write request(s) of the write transaction to a leaseholder replica of the range 160 including the keys indicated by the write transaction. The node 120 storing and operating the leaseholder replica of the range 160 may receive and send the write request(s) to the node 120 storing and operating the leader replica of the range 160. In most cases, the leaseholder of the range 160 and the leader replica of the range 160 are configured to be same replica stored and operated on the same node 120. The node 120 storing and operating the leader replica may send the write request(s) to the corresponding nodes 120 storing and operating the follower replicas of the range 160 for replication, write intent(s) corresponding to the write request(s) to the leader replica, and append the write request(s) to a Raft log for the leader replica operated by the node 120. The node 120 storing and operating the leader replica may only append the write request(s) to its Raft log once a threshold number (e.g., a majority) of the nodes 120 storing and operating the replicas of the range (e.g., including the leader nodes and follower nodes) agree to append the write request(s) to their respective Raft logs by acknowledging the write request(s). The nodes 120 storing and operating the follower replicas of the range may receive the write request(s) from the node 120 storing and operating the leader replica, send acknowledgment of receipt of the write request(s) to the node 120 storing and operating the leader replica, append the write request(s) to the corresponding Raft logs for the follower replicas operated by the nodes, write intent(s) corresponding to the appended write request(s) to the follower replicas, and send an indication to the node 120 storing and operating the leader replica that the write request(s) were appended. The nodes 120 storing and operating the follower replicas of the range may only append the write request(s) to their respective Raft logs after sending an acknowledgment of receipt of the write request(s) to the node 120 storing and operating the leader node and receiving an indication from the node 120 storing and operating the leader replica to append the write requests to their Raft logs. Based on a threshold number (e.g., a majority) of the nodes 120 storing and operating the replicas acknowledging and/or sending an acknowledgment to the node 120 storing and operating the leader replica that the write request(s) were received and/or appended, the node 120 storing and operating the leader replica may commit the write transaction (e.g., by appending the write request(s) to its Raft log). The node 120 storing and operating leader replica may send an indication to the nodes 120 storing and operating follower replicas to commit the write request(s) (e.g., by appending the write request(s) to their Raft logs) and the write transaction. In some cases, write requests of the write transaction may be considered committed when appended to the leader replica's Raft log. The node 120 storing and operating leader replica may send an acknowledgement of a commit of the write request(s) and the write transaction to the node 120 storing and operating leaseholder, and the node 120 storing and operating leaseholder may send the acknowledgement to the gateway node. The gateway node may send the acknowledgement to the client device 106.

As shown in FIG. 2B, at step 211, the client device 106 may send a write transaction to the cluster 102. A node 120*c* functioning as the gateway node may receive the write transaction from the client device. The node 120*c* may be a node 120 of the cluster 102 that is located closest to the client device 106, with the closeness between the nodes 120 and the client device 106 being defined, for example, by a latency and/or a proximity as described herein. The write transaction may include at least one write request may be directed to writing to data stored by the range 160*a*. At step 212, the node 120*c* may send the write request(s) of the received write transaction to the node 120*a*. The write transaction may be sent to the node 120*a* based on the node 120*a* being the leaseholder node and storing the leaseholder replica of the range 160*a*. Based on the leaseholder replica stored by the node 120*a* also being configured as the leader replica for the range 160*a*, the leader replica of range 160*a* may append the write request(s) to a Raft log at node 120*a*. At step 213, the leader replica may synchronously (e.g., simultaneously) send the write request(s) to the follower replicas of range 160*a* stored and operating on the node 120*b* and the node 120*c*, respectively. The node 120*b* and the node 120*c* may receive the write request(s) and append the write request(s) to their respective Raft logs. At step 214, the follower replicas of the range 160*a* operating at the nodes 120*b*, 120*c* may send an indication to the leader replica of the range 160*a* that the write request(s) were appended to their Raft logs. Based on a threshold number of replicas indicating the write request(s) were appended to their Raft logs, the leader replica and follower replicas of the range 160*a* may commit the write request(s) and the write transaction. At step 215, the node 120*a* may send an acknowledgement of the committed write transaction to the node 120*c*. At step 216, the node 120*c* may send the acknowledgement of the committed write transaction to the client device 106*a* to complete the write transaction.

Routing Requests Around Network Partitions

In some embodiments, as described herein, nodes of the cluster can operate as gateway nodes that connect client devices to ranges stored among nodes of the cluster. To remedy the deficiencies associated with network partitions between gateway nodes and leaseholder nodes with which the gateway nodes intend to communicate, an improved routing algorithm is introduced for execution by the cluster that maintains availability and access to range data. Such a routing algorithm enables execution of received read and write requests directed to leaseholder ranges stored by leaseholder nodes in the event of network partitions between the leaseholder nodes and gateway nodes that received the read and write requests from client devices.

To implement the routing algorithm, nodes can maintain and update (i) leaseholder information identifying the nodes storing replicas of ranges and (ii) connectivity information identifying an ability for the node to communicate with other nodes of the cluster directly without other proxy nodes operating as intermediaries. As a described herein, each node may store a copy of leaseholder information identifying, for each range stored by the cluster, the nodes storing replicas of that range, the leaseholder node storing the leaseholder replica for that range, the leader node storing the leader replica for that range, follower nodes storing the follower replicas for that range, and locality information for the nodes storing replicas of that range identifying the geographic location (e.g., database region) of each of the nodes. The leaseholder information may be current as of a particular timestamp and may be updated as the nodes storing replicas of ranges change, such as changes in leaseholder and leader replicas. In some cases, leaseholder information may become out of date when the leaseholder information does not correctly identify the particular nodes storing particular replicas of a range. A first node may receive updated leaseholder information from a second, different node of the cluster, thereby causing the first node to update its leaseholder information with the timestamp at which the leaseholder information was updated. In some cases, the leaseholder information may include locality information indicating the geographic location of each of the nodes of the cluster and identifying a closeness between the node storing the leaseholder information and the other nodes of the cluster. Using the locality information, a node may identify and preferably communicate with other nodes that are located closest to the node to reduce latencies for executing requests. In some cases, closeness between a pair of nodes may be defined by latency between the nodes, geographic proximity between the nodes, and/or any other suitable indication of closeness. Locality information associated with nodes may be based on database regions in which nodes are geographically located and assigned.

In some embodiments, to enable operation of the routing algorithm, each node may store and update connectivity information for the ability of that node to communicate with other nodes of the cluster via network(s) connecting the nodes. The connectivity information stored by a particular node may identify other nodes of the cluster and include indicators of whether the node can communicate with the other nodes. As described herein, a network partition may exist for a period of time between a first node and a second node of the cluster when the first node cannot communicate directly with the second node via one or more networks without using another intermediate node as a proxy for communication between the first and second nodes. Some non-limiting examples of causes of a network partition can include a network outage or failure, physical partition (e.g., severed physical hardware used to communicatively connect two nodes), a network misconfiguration (e.g., a misconfigured border gateway protocol (BGP)) causing data to be misrouted when directed between two nodes, a network misconfiguration of an overlay network, an overload of a link on one or more networks communicatively connecting two nodes, and misconfigured Domain Name System (DNS) information for a particular node. Accordingly, each node can update its connectivity information based on the presence or absence of network partitions between that node and other nodes of the cluster. Further, a node may receive and apply an update for its connectivity information from another node of the cluster.

In some embodiments, a node included in a pair of nodes of the cluster may detect a network partition with the other node of the cluster using a "heartbeat" message as a part of a heartbeat message protocol. A first node may detect a network partition with a second node of the cluster using heartbeat messages received or not received from the second node. As an example, the first and second nodes may be any of a gateway node and a leaseholder node, a gateway node and a proxy node, and a proxy node and a leaseholder node. In some cases, each pair of nodes may execute a heartbeat protocol to maintain connectivity between the nodes and identify a network partition. To execute a heartbeat protocol, the first and second nodes forming a pair of nodes may send requests to initiate connections using independent Transmission Control Protocols (TCPs). The first node may send a request to initiate a connection (e.g., TCP connection) with the second node and the second node may send a request to initiate a connection (e.g., TCP connection) with the first node. Based on the first and second nodes initiating and establishing independent connections via the one or more networks, the first and second nodes can send and receive heartbeat messages via the one or more networks. The first and second nodes may each periodically send heartbeat messages therebetween. As an example, the first and second nodes may send heartbeat messages periodically (e.g., every second, every two seconds, etc.) therebetween identifying the sender and intended recipient of the respective heartbeat message. When one of the first and second nodes fails to receive a threshold number (e.g., two messages, three messages, etc.) of consecutive heartbeat messages from the other node, the node that failed to receive the threshold number of consecutive heartbeat messages may sever its connection to the other node, stop sending periodic heartbeat messages to the other node, and update its connectivity information to indicate that a network partition exists between the pair of nodes. As an example, when a first node of a pair of nodes fails to receive three consecutive messages from a second node of the pair, the first node can sever its connection to the second node, stop sending heartbeat messages to the second node, and update its connectivity information to indicate that a network partition exists between the first and second nodes.

In some embodiments, in response to the first node of the pair severing the connection with the second node and stopping sending of heartbeat messages to the second node, the second node can similarly determine it failed to receive the threshold number of consecutive heartbeat messages from the first node. In response to determining a failure to receive the threshold number of consecutive heartbeat messages from the first node, the second node can sever its connection to the first node, stop sending heartbeat messages to the first node, and update its connectivity information to indicate that a network partition exists between the first and second nodes. In some cases, after severing a connection to another node, the node can periodically initiate a new connection with the other node in attempt to reestablish communication with the other node. As an example, after the first node severs a connection to the second node and updates its connectivity information with respect to the second node, the first node can send a request to initiate a connection (e.g., TCP connection) with the second node to reestablish the heartbeat messages as described herein. The network partition between the first and second nodes may be healed and resolved when the first and second nodes are able to reestablish their respective connections and continue sending and receiving the heartbeat messages.

Figure 3:
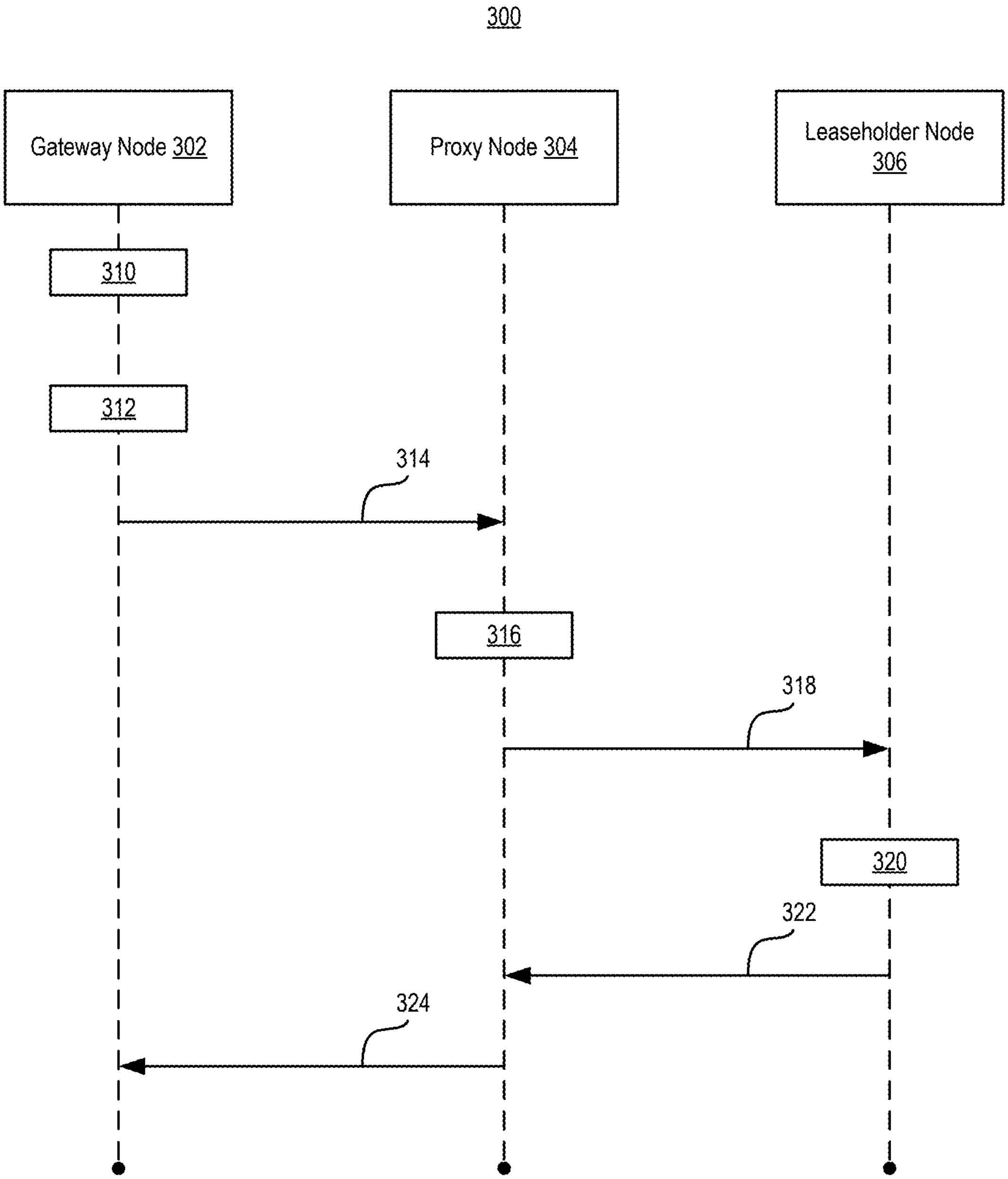
FIG. 3 shows an exemplary illustration of sequence of operations for a routing algorithm for routing a request around a network partition, according to some embodiments.

Referring to FIG. 3, a sequence 300 of operations for implementing a routing algorithm to avoid a network partition is illustrated. As an example, the sequence 300 may operate for a gateway node 302, a proxy node 304, and a leaseholder node 306 that are each different nodes within the cluster. The gateway node 302 may be a node of a cluster that initially receives a transaction including one or more requests from a client device (e.g., a client device 106). As an example, the gateway node 302 may receive the transaction from the client device before any other node of the cluster and may operate a transaction coordinator for the transaction (e.g., unless the client device previously communicated with another node operating as the gateway node). In some cases, the gateway node 302 may be the node of the cluster that is closest to the client device as described herein as determined by a load balancer that determines which node of the cluster is to receive the transaction from the client device. The transaction may include at least one request, with the at least one request including a read request or a write request. The request may be directed to a range, such that the request reads value(s) from one or more keys included in the range or writes one or more values to key(s) of the range. While the sequence 300 is described with respect to at least one request directed to only one range, the sequence 300 may operate in parallel for two or more requests directed to different ranges, such that the gateway node can communicate with one or more leaseholder nodes storing leaseholder replicas of different ranges. In some cases, the gateway node 302 may also be the leaseholder node 306 for at least one request included in a transaction. Such a node may not operate according to the sequence 300, such that the node may receive the at least one request (e.g., operating as the gateway node 302) and process and cause execution of the at least one request (e.g., operating at the leaseholder node 306). In some cases, communication between nodes as part of execution of the requests may involve direct or indirect communication between the nodes. As an example, communication between the gateway node 302, the proxy node 304, the leaseholder node 306, and/or nodes identified as being such nodes (e.g., by leaseholder information) relating to execution of particular request may be direct communication via one or more (e.g., two or more) networks without communication with other nodes of the cluster.

In some embodiments, the proxy node 304 may be a node of the cluster that stores a replica of the range to which the request is directed that is not the leaseholder replica of the replica of the range. One or more nodes of the cluster that stores a replica of the range may operate as a proxy node 304 for the sequence 300. The gateway node 302 may initiate communications with the proxy node 304 based on determining a network partition exists between the gateway node 302 and the leaseholder node 306, such that the gateway node 302 can communicate with the leaseholder node 306 via the proxy node 304.

In some embodiments, the leaseholder node 306 may be a node of the cluster storing the leaseholder replica for the range to which the at least one request is directed. In some cases, the leaseholder node 306 may also be a leader node for the range to which the at least one request is directed, with the replica of the range stored and operated by the leaseholder node 306 being configured to operate as both the leaseholder and leader replica for the range.

At step 310, the gateway node 302 can receive a transaction from a client device via one or more networks. The transaction may include at least one request, with the at least one request including a read request or a write request. The request can be directed to a range, such that the request reads value(s) from one or more keys included in the range or writes one or more values to key(s) of the range. The transaction may include an indicator identifying the range(s) to which the transaction is directed. Based on receiving the transaction, the gateway node 302 can evaluate the transaction and the at least one request to identify the range to which the at least one request of the transaction is directed. In response to identifying the range to which the at least one request of the transaction is directed, the gateway node 302 can identify the nodes of the cluster storing replicas of the range, including the leaseholder replica of the range and the other nodes of the cluster storing replicas of the range other than the leaseholder. The gateway node 302 can identify the nodes of the cluster storing replicas of the range using the leaseholder information available to (e.g., stored by) the gateway node 302. In some cases, the leaseholder information available to a particular node may be up-to-date, with the leaseholder information correctly identifying the nodes storing the replicas of the range. In some cases, the leaseholder information may be out-of-date, with the leaseholder information incorrectly identifying the nodes storing the replicas of the range. The leaseholder information may be out-of-date based on a failure of a node previously storing a replica of a range, a leaseholder change causing a different node to store the leaseholder replica of the range after the time at which the leaseholder information was last updated at the gateway node 302, and/or a leader change causing a different node to store the leader replica of the range after the time at which the leaseholder information was last updated at the gateway node 302.

In some embodiments, in response to identifying the nodes of the cluster storing replicas of the range, the gateway node 302 can identify, from the lease information available to the gateway node, the leaseholder node storing the leaseholder replica of the range and sort the remaining nodes storing replicas of the range to generate a sorted list identifying the remaining nodes in order of closeness to the gateway node 302. The gateway node 302 can sort the remaining nodes storing replicas of the range in order of closeness to the gateway node 302 using the locality information included in the leaseholder information. Based on sorting the remaining nodes storing replicas of the range in order of closeness to the gateway node 302, the gateway node 302 can use the sorted list of the remaining nodes storing replicas of the range as candidates for the proxy node 304.

At step 312, in response to receiving the transaction from the client device and identifying, from the leaseholder information available to the gateway node 302, the leaseholder node storing the leaseholder replica of the range to which the at least one request of the transaction is directed, gateway node 302 can determine whether a network partition exists between the gateway node 302 and the identified leaseholder node. The gateway node 302 may determine that a network partition exists or does not exist between the gateway node 302 and the leaseholder node based on its connectivity information and using heartbeat messages as described herein. In some cases, the gateway node 302 may periodically determine whether a network partition exists between the gateway node 302 and the leaseholder node (e.g., using a threshold number of missed heartbeat messages). In some cases, the gateway node 302 may determine whether a network partition exists between the gateway node 302 and the leaseholder node on an ad-hoc basis in response to receiving the transaction from the client device and identifying the leaseholder node storing the leaseholder replica of the range to which the at least one request of the transaction is directed. As an example, in response to receiving the transaction from the client device and identifying the leaseholder node storing the leaseholder replica of the range to which the at least one request of the transaction is directed, the gateway node 302 may determine whether it has failed to receive a threshold number of consecutive heartbeat messages from the leaseholder node. The gateway node 302 may determine a network partition exists between the gateway node 302 and the leaseholder node, such that the gateway node 302 is unable to communicate with the leaseholder node to cause execution of the at least one request without the use of another node of the cluster.

At step 314, in response to determining a network partition exists between the gateway node 302 and the leaseholder node identified by the leaseholder information available to the gateway node 302, the gateway node 302 can select a proxy node 304 from the sorted list of the remaining nodes storing replicas of the range. In some cases, the gateway node 302 may select a proxy node 304 as a node that does not store a replica of the range. The gateway node 302 may select the proxy node 304 to be a node that is closest to the gateway node 302 of the remaining nodes storing replicas of the range. In some cases, the gateway node 302 may select the proxy node 304 from the remaining nodes storing replicas of the range using additional or alternative criteria. In some cases, the gateway node 302 may select more than one node to operate as the proxy node 304 as described herein. In some cases, only one node storing a replica of a range may operate as the proxy node 304 at a particular time for the at least one request of the transaction directed to the range. In response to selecting the proxy node 304, the gateway node 302 can determine whether a network partition exists between the gateway node 302 and the proxy node 304 (e.g., using techniques as described for step 312). The gateway node 302 may determine a network partition does not exist between the gateway node 302 and the proxy node 304, such that the gateway node 302 can communicate directly with the proxy node 304 via one or more networks. In response to selecting the proxy node 304 and determining a network partition does not exist between the gateway node 302 and the proxy node 304, the gateway node 302 can generate and send a proxy request to the proxy node 304. The proxy request can include the at least one request from the transaction directed to the range, an indicator (e.g., a header) identifying both the proxy request and the leaseholder node (e.g., indicated by the leaseholder information available to the gateway node 302) as the target of the proxy request based on the leaseholder information available to (e.g., stored by) the gateway node 302, and an indicator of a version of leaseholder information available to the gateway node 302 used to generate the proxy request. The proxy node 304 may receive the proxy request from the gateway node 302.

At step 316, in response to receiving the proxy request from the gateway node 302, the proxy node 304 can evaluate the proxy request. In some cases, the proxy node 304 can evaluate the proxy request based on leaseholder information available to (e.g., stored by) the proxy node 304. In some cases, the proxy node 304 can identify the leaseholder node for the range identified by the proxy request and compare the identified leaseholder node to the leaseholder node for the range identified in the leaseholder information available to the proxy node 304. In some cases, based on the comparison, the proxy node 304 can determine the leaseholder node for the range identified by the proxy request and the leaseholder node for the range identified in the leaseholder information available to the proxy node 304 are the same node. In response to determining the leaseholder node for the range identified by the proxy request and the leaseholder node for the range identified in the leaseholder information available to the proxy node 304 are the same node, the proxy node 304 can determine whether a network partition exists between the identified leaseholder node and the proxy node 304 (e.g., using techniques as described for step 312). In some cases, the proxy node 304 may determine a network partition does not exist between the leaseholder node and the proxy node 304, such that the proxy node 304 can communicate directly with the identified leaseholder node via one or more networks. In some cases, the proxy node 304 may determine a network partition does exist between the leaseholder node and the proxy node 304, such that the proxy node 304 is unable to communicate directly with the identified leaseholder node via one or more networks without the use of another node of the cluster operating as a proxy. In response to determining a network partition does exist between the leaseholder node and the proxy node 304, the proxy node 304 can send a failed response to the gateway node 302 indicating a failure of the proxy request to reach the identified leaseholder node (not shown in FIG. 3). The gateway node 302 may receive the failed response from the proxy node 304 and may retry generating and sending a proxy request to a newly selected proxy node 304 (e.g., as described with respect to step 314). The gateway node 302 can select a new proxy node 304 from the sorted list of the remaining nodes storing replicas of the range. The proxy node 304 may be selected as a node that is next closest to the gateway node 302 of the remaining nodes storing replicas of the range, excluding nodes that have already been selected as the proxy node 304. The gateway node 302 may iterate through and select a new proxy node 304 from the sorted list of the remaining nodes storing replicas of the range to retry sending the proxy request until the leaseholder node 306 successfully causes execution of the at least one request. When the gateway node 302 iterates through and selects each node of the sorted list of the remaining nodes as a new proxy node 304 without successfully causing execution of the at least one request, the gateway node can send a failure response to the client device indicating a failure of the transaction (not shown in FIG. 3).

In some cases, based on the comparison of the leaseholder node identified by the proxy request to the leaseholder node for the range identified in the leaseholder information available to the proxy node 304, the proxy node 304 can determine the leaseholder node for the range identified by the proxy request and the leaseholder node for the range identified in the leaseholder information available to the proxy node 304 are different nodes. When the proxy node 304 determines the leaseholder nodes identified by the proxy request and leaseholder information available to the proxy node 304 are different nodes, the proxy node 304 may determine whether the proxy request was generated using newer (e.g., more up-to-date) lease information (e.g., available to the gateway node 302) than the lease information available to the proxy node 304. When the proxy node 304 determines the proxy request was generated using newer (e.g., more up-to-date) lease information than the lease information available to the proxy node 304, the proxy node 304 may update its leaseholder information with the updated leaseholder node identified by the proxy request. In response to updating its leaseholder information, the proxy node 304 can determine the leaseholder node for the range identified by the proxy request and the leaseholder node for the range identified in the leaseholder information available to the proxy node 304 are the same node and can proceed as described herein by determining whether a network partition exists between the identified leaseholder node and the proxy node 304.

In some embodiments, when the proxy node 304 determines the proxy request was not generated using newer (e.g., more up-to-date) lease information than the lease information available to the proxy node 304 (e.g., using versions of leaseholder information), the proxy node 304 may determine whether it stores the leaseholder replica for the range based on the leaseholder information available to the proxy node 304. When the proxy node 304 determines it stores the leaseholder replica for the range, the proxy node 304 can process the proxy request locally due to the proxy node 304 and the leaseholder node 306 being the same node (not shown in FIG. 3), such that the proxy node 304 can process and cause execution of the at least one request directly. The proxy node 304 and the leaseholder node 306 may be the same node when the gateway node 302 uses out-of-date leaseholder information that does not identify the proxy node 304 as the leaseholder node 306, such that the gateway node 302 does not recognize the proxy node 304 as being the leaseholder node 306. Based on processing and causing execution of the at least one request, the proxy node 304 may send read values to the gateway node 302 and/or send an acknowledgement of a committed write operation to the gateway node 302 (not shown in FIG. 3). The proxy node 304 can further send updated leaseholder information to the gateway node 302 for the gateway node 302 to use to update the leaseholder information available to the gateway node 302 (not shown in FIG. 3). Accordingly, the proxy node 304 can cause an update to the leaseholder information available to the gateway node 302 to enable routing of the at least one request to the leaseholder node 306.

In some embodiments, when the proxy node 304 determines the leaseholder nodes identified by the proxy request and the leaseholder information available to the proxy node 304 are different and the proxy node 304 does not store the leaseholder replica for the range, the proxy node 304 may send an error message including updated leaseholder information to the gateway node 302 for the gateway node 302 to use to update the leaseholder information available to the gateway node 302. The gateway node 302 may receive the error message including the updated leaseholder information from the proxy node 304 and may update the leaseholder information available to the gateway node 302 when the updated leaseholder information from the proxy node 304 is newer than the leaseholder information available to the gateway node 302. When the updated leaseholder information from the proxy node 304 is newer than the leaseholder information available to the gateway node 302, the gateway node 302 may update its leaseholder information with the updated leaseholder node identified by the updated leaseholder information from the proxy node 304 and may restart the sequence 300 with identification of the leaseholder node 306 based on the updated leaseholder information (e.g., as described with respect to step 310). Accordingly, the proxy node 304 can cause updates to the leaseholder information available to the gateway node 302 to enable routing of the at least one request to the leaseholder node 306.

At step 318, in response to (i) determining the leaseholder node for the range identified by the proxy request and the leaseholder node for the range identified in the leaseholder information available to the proxy node 304 are the same node and (ii) determining a network partition does not exist between the identified leaseholder node and the proxy node 304, the proxy node 304 can send the at least one request included in the proxy request to the identified leaseholder node with an indicator of a version of leaseholder information available to the proxy node 304 used to process the proxy request. In some cases, the identified leaseholder node to which the proxy node 304 sends at least one request included in the proxy request may not be the leaseholder node 306. The identified leaseholder node may not be leaseholder node 306 when the gateway node 302 and the proxy node 304 both operate using out-of-date leaseholder information available to the nodes. The identified leaseholder node to which the proxy node 304 sends at least one request may receive the at least one request from the proxy node 304. In response to receiving the at least one request, the identified leaseholder node can evaluate the at least one request based on leaseholder information available to (e.g., stored by) the identified leaseholder node. In some cases, the identified leaseholder node can determine it is not the leaseholder node 306 by evaluation of leaseholder information available to (e.g., stored by) the identified leaseholder node. The leaseholder information available to the identified leaseholder node may be newer and more up-to-date than the leaseholder information available to each of the gateway node 302 and proxy node 304. In response to receiving the at least one request and determining it is not the leaseholder node 306, the identified leaseholder node may send an error message including updated leaseholder information to the proxy node 304 for the proxy node 304 to use to update the leaseholder information available to proxy node 304. The proxy node 304 may receive the error message including the updated leaseholder information from the identified leaseholder node and may update the leaseholder information available to the proxy node 304 when the updated leaseholder information from the identified leaseholder node is newer than the leaseholder information available to the proxy node 304. When the updated leaseholder information from the identified leaseholder node is newer than the leaseholder information available to the proxy node 304, the proxy node 304 may update its leaseholder information with the updated leaseholder node identified by the updated leaseholder information from the identified leaseholder node.

In some embodiments, in response to updating its leaseholder information using the updated leaseholder information from the identified leaseholder node, the proxy node 304 may send an error message including updated leaseholder information to the gateway node 302 for the gateway node 302 to use to update the leaseholder information available to the gateway node 302. The gateway node 302 may receive the error message including the updated leaseholder information from the proxy node 304 and may update the leaseholder information available to the gateway node 302 when the updated leaseholder information from the proxy node 304 is newer than the leaseholder information available to the gateway node 302. When the updated leaseholder information from the proxy node 304 is newer than the leaseholder information available to the gateway node 302, the gateway node 302 may update its leaseholder information with the updated leaseholder node identified by the updated leaseholder information from the proxy node 304 and may restart the sequence 300 with identification of the leaseholder node 306 based on the updated leaseholder information (e.g., as described with respect to step 310). Accordingly, the identified leaseholder node can cause updates to the leaseholder information available to each of the gateway node 302 and the proxy node 304 to enable routing of the at least one request to the leaseholder node 306.

At step 320, when the gateway node 302 and the proxy node 304 have up-to-date leaseholder information, the leaseholder node 306 can receive the at least one request from the proxy node 304 and process and execute the at least one request. The leaseholder node 306 may process and execute the at least one request, for example, including a read request by reading the value(s) of the key(s) or key span identified by the at least one request from the leaseholder replica of the range stored and operated by the leaseholder node 306. As described herein, the leaseholder node 306 may execute the read request by reading and returning value(s) of the version (e.g., most recent version) of the key(s) having the largest timestamp that is less than or equal to the transaction's read timestamp. The leaseholder node 306 may process the at least one request, for example, including a write request by sending the write request to a leader node storing a leader replica for the range, thereby causing the leader node to execute a consensus protocol with follower nodes as described herein to write value(s) for new versions of key(s) included in the range. To commit the written value(s), a quorum (e.g., majority) of voting replicas must agree to commit the written value(s). In some cases, the leaseholder node 306 may also be the leader node for the range, such that the replica of the range stored and operated by the leaseholder node 306 is configured to operate as both the leaseholder range and the leader replica for the range.

At step 322, in response to execution of the at least one request, the leaseholder node 306 can generate and send a response for the at least one request to the proxy node 304. The response may include value(s) of key(s) from execution of a read request included in the at least one request and/or acknowledgement of successful execution of a write request included in the at least one request. The proxy node 304 can receive the response for the at least one request from the leaseholder node 306.

At step 324, in response to receiving the response for the at least one request from the leaseholder node 306, the proxy node 304 can generate and send a proxy response to the gateway node 302, with the proxy response including the response from the leaseholder node 306 and an indicator (e.g., a header) identifying the proxy response and the leaseholder node 306 as the target of the initial proxy request based on the leaseholder information available from the gateway node 302. The gateway node 302 can receive the proxy response from the proxy node 304 and can await responses (e.g., acknowledgement) for any other requests included in the transaction initially received by the gateway node 302. Based on receiving the proxy response and a response for any other request (e.g., indicating success of the request(s)) included in the transaction, the gateway node 302 can send a response to the client device with read values from the range(s) of the cluster to which the transaction was directed and/or acknowledgement of write operations to the range(s) of the cluster to which the transaction was directed.

Exemplary Method for Routing Requests Around Network Partitions

Figure 4:
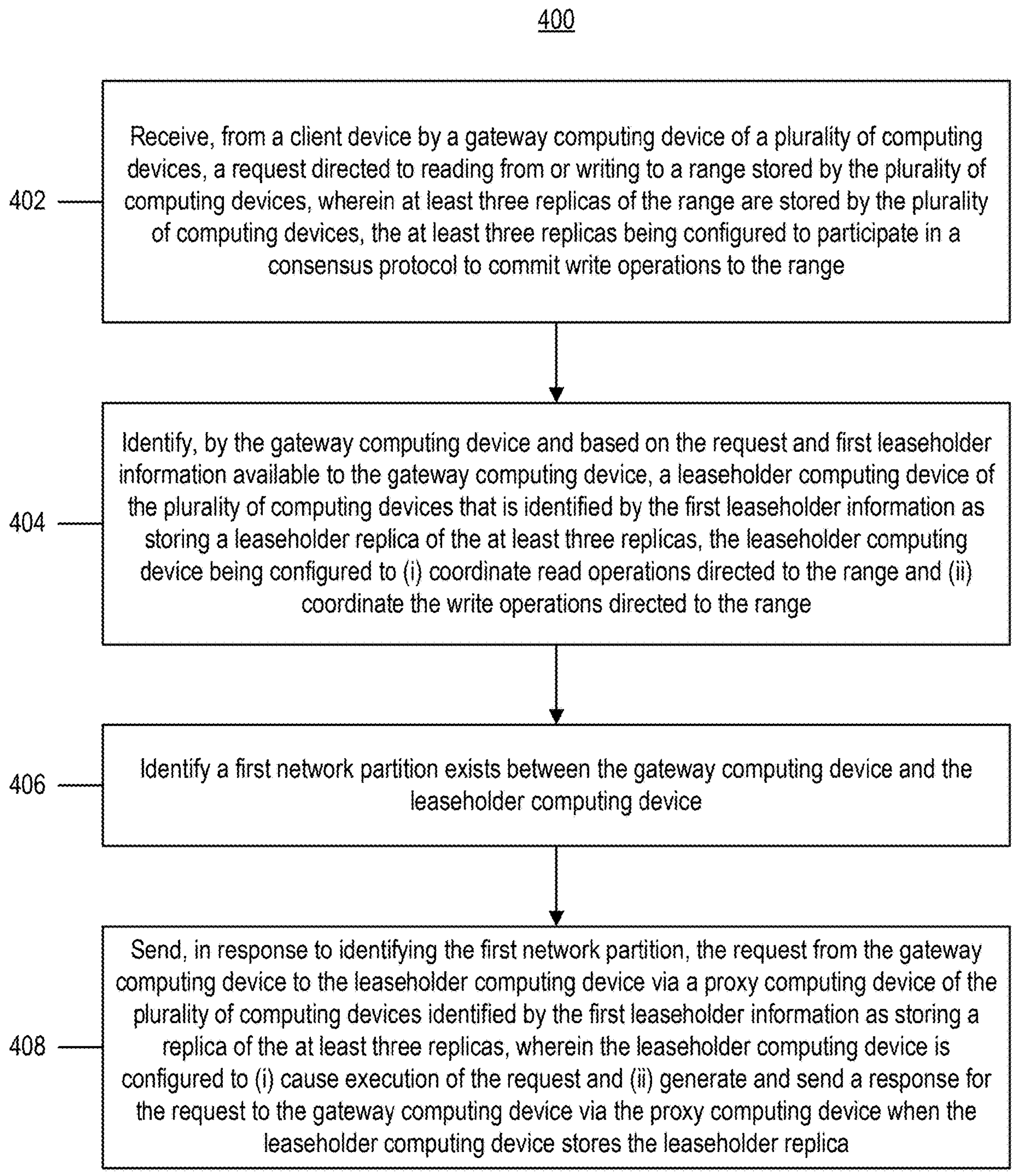
FIG. 4 shows an exemplary flowchart of a method for routing a request around a network partition, according to some embodiments, according to some embodiments.

In some embodiments, as described herein, a network partition can form between a gateway node that initially receives a transaction including one or more requests and a leaseholder node storing a leaseholder replica of a range to which at least one of the request(s) is directed. To avoid increased latencies resulting from waiting for the network partition to head and allow the at least one request to execute, nodes of the cluster can execute a routing algorithm that sends the at least one request from the gateway node to the leaseholder node via another node of storing a replica of the range operating as a proxy. Referring to FIG. 4, an exemplary flowchart of a method 400 for routing a request around a network partition is illustrated. While the method 400 is described with respect to routing and causing execution of a single request (e.g., directed to reading or writing to a range for which the leaseholder node is the leaseholder), the method 400 may be executed in parallel (e.g., simultaneously) by a number of nodes for a number of different transactions involving a number of requests directed to data, such as different KVs and/or ranges including KVs stored by the cluster. Transactions directed to reading from and/or writing to data stored by the cluster may originate from (e.g., be sent by) one or more client devices (e.g., client devices 106) communicatively connected to the cluster. The method 400 may be executed by the nodes of the cluster at least while a network partition exists between the gateway node and the leaseholder node for a duration lasting at least until the network partition is healed.

At step 402, a gateway node of the number of nodes from the cluster can receive, from a client device communicatively connected to the gateway node by one or more networks, a request directed to reading from or writing to a range stored by the nodes of the cluster. At least three replicas of the range can be stored by the nodes, with the at least three replicas being configured to participate in a consensus (i.e., Raft) protocol to commit write operations to the range. In some cases, as described herein, a table may include one or more ranges including the range, with the range including KV data. The request received by the gateway node from the client device may be included in a transaction including one or more requests. As described herein, the gateway node can first receive the request from the client device via one or more networks before any other node of the cluster based on the gateway node being the closest node of the cluster relative to the client device (e.g., as determined by a load balancer). In some cases, the gateway node can receive the request as part of receiving a transaction from the client device including one or more requests including the received request. Each replica of the at least three replicas of the range is stored by a different node of the nodes of the cluster, such that the same node does not store two more replicas of the same range. In some cases, in response to receiving the request from the client device, the gateway node can evaluate the request to determine the request is directed to reading from or writing to the range and identifying, from the first leaseholder information, respective nodes of the cluster storing the at least three replicas of the range. As an example, the gateway node can identify the leaseholder node, leader node, and follower nodes storing the at least three replicas of the range from the first leaseholder information available to the gateway node. In some cases, in response to determining the respective nodes of the cluster storing the at least three replicas of the range, the gateway node can determine a closeness of each of the respective nodes storing the at least three replicas of the range (e.g., excluding the leaseholder node identified by the first lease information) to the gateway computing device. The gateway node may determine the closeness of the nodes relative to the gateway computing device using the first lease information. In response to determining the closeness of each of the nodes relative to the gateway computing device, the gateway node can identify, based on the first leaseholder information, a particular proxy node from the nodes (e.g., excluding the leaseholder node identified by the first lease information) as being the closest of the nodes storing the at least three replicas of the range to the gateway computing device. The gateway node may use the node identified as the proxy node from the first lease information to communicate with the node identified as the leaseholder node as described herein. As described herein, a closeness of each of the respective nodes storing the at least three replicas of the range to the gateway node can be defined by at least one of a geographic proximity and/or a latency.

At step 404, the gateway node can identify, based on the request and first leaseholder information available to (e.g., stored by) the gateway node, a leaseholder node for the range from the nodes of the cluster that is identified by the first leaseholder information as storing a leaseholder replica of the at least three replicas of the range. As described herein, the node identified by the first leaseholder information as being the leaseholder node may be or may not be the leaseholder node for the range based on whether the first lease information is up-to-date. The gateway node can identify the leaseholder node from the first leaseholder information in response to receiving and evaluating the request from the client device. The leaseholder node may be a different node than the gateway node. The leaseholder node can be configured to coordinate read operations directed to the range by receiving and executing all read requests directed to reading the latest (e.g., most recent) data included in the range. The leaseholder node can be configured to coordinate the write operations directed to the range by receiving write requests directed to the range and providing the write requests to the leader node to execute a consensus (e.g., Raft) protocol among the leader replica and follower replicas. In some cases, the leaseholder node and the leader node are the same node, such that the replica of the range that is stored by the node is both the leaseholder replica and the leader replica for the range.

At step 406, the gateway node can identify a first network partition exists between the gateway node and the node identified by the first leaseholder information as being the leaseholder node. The gateway node can identify the first network partition exists between the gateway node and the node identified by the first leaseholder information as being the leaseholder node in response to identifying the leaseholder node and/or based on heartbeat messages as described herein. The first network partition may exist such that the gateway node and the identified leaseholder node cannot communicate via any network without using another node of the cluster as an intermediate proxy for communication. In some cases, the gateway node can identify the network partition exists by identifying a failure to receive two or more consecutive heartbeat messages from the node identified by the first leaseholder information as being the leaseholder node.

At step 408, in response to identifying the network partition, the gateway node can send the request to the leaseholder node via a proxy node identified by the first leaseholder information as storing a replica of the at least three replicas. The proxy node may be selected as described herein using closeness of nodes storing the at least three replicas of the range. In response to receiving the request via the proxy node, the leaseholder node may be configured to (i) cause execution of the request and (ii) generate and send a response for the request to the gateway node via the proxy node when the leaseholder node stores the leaseholder replica. The leaseholder node may be able to cause execution of the request when the leaseholder node stores the leaseholder replica and network partitions do not exist between the gateway node and the proxy node and the proxy node and the leaseholder node, respectively. In some cases, sending the request to the leaseholder node from the gateway node via a proxy node can include generating and sending, by the gateway node in response to identifying the network partition, a proxy request to the proxy node storing a first replica of the plurality of replicas that is different from the leaseholder replica. In some cases, the proxy request can include the request and a proxy indicator identifying the leaseholder node. The proxy node can receive and evaluate the proxy request as described herein by comparing the proxy indicator with second leaseholder information available to the proxy node. In some cases, based on the comparison of the proxy indicator with the second leaseholder information, the proxy node can determine both the proxy indicator and the second leaseholder information identify the same node as being the leaseholder node storing the leaseholder replica. In response to determining both the proxy indicator and the second leaseholder information identify the same node as being the leaseholder node storing the leaseholder replica, the proxy node can generate and send, based on the comparison of the proxy indicator with the second leaseholder information, the request to the identified leaseholder node. When the identified leaseholder node is the leaseholder node for the range, the leaseholder node can receive the request from the proxy node and cause execution of the request in response to receiving the request. In response to causing execution of the request, the leaseholder node can generate and send the response for the request to the gateway computing device via the proxy computing device in response to causing execution of the request. In some cases, one or more additional or alternative steps may be executed as a part of the method 400 (e.g., as described with respect to the sequence 300).

FURTHER DESCRIPTION OF SOME EMBODIMENTS

Figure 5:
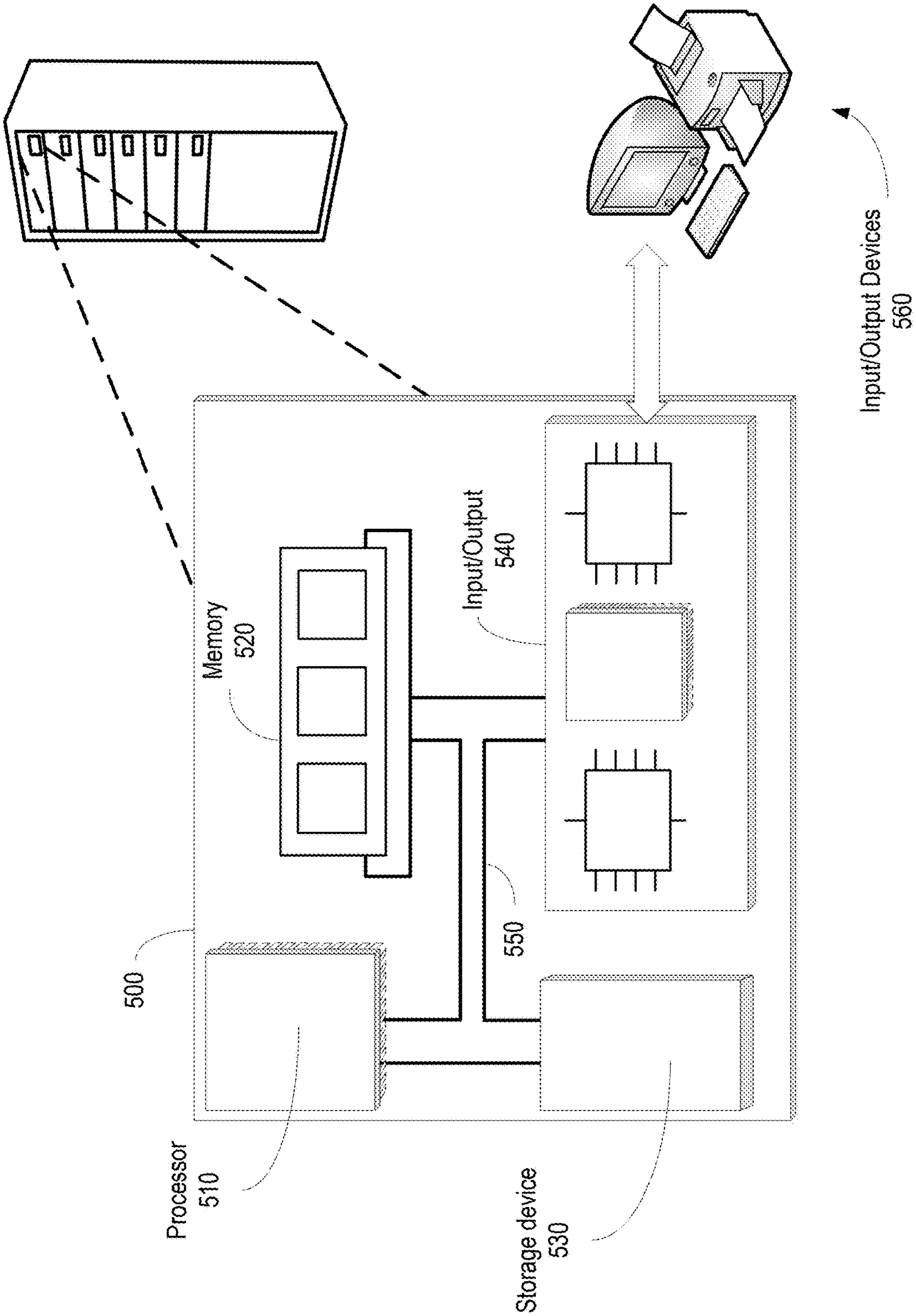
FIG. 5 is a block diagram of an example computer system.

FIG. 5 is a block diagram of an example computer system 500 that may be used in implementing the technology described in this document. General-purpose computers, network appliances, mobile devices, or other electronic systems may also include at least portions of the system 500. The system 500 includes a processor 510, a memory 520, a storage device 530, and an input/output device 540. Each of the components 510, 520, 530, and 540 may be interconnected, for example, using a system bus 550. The processor 510 is capable of processing instructions for execution within the system 500. In some implementations, the processor 510 is a single-threaded processor. In some implementations, the processor 510 is a multi-threaded processor. The processor 510 is capable of processing instructions stored in the memory 520 or on the storage device 530.

The memory 520 stores information within the system 500. In some implementations, the memory 520 is a non-transitory computer-readable medium. In some implementations, the memory 520 is a volatile memory unit. In some implementations, the memory 520 is a non-volatile memory unit.

The storage device 530 is capable of providing mass storage for the system 500. In some implementations, the storage device 530 is a non-transitory computer-readable medium. In various different implementations, the storage device 530 may include, for example, a hard disk device, an optical disk device, a solid-date drive, a flash drive, or some other large capacity storage device. For example, the storage device may store long-term data (e.g., database data, file system data, etc.). The input/output device 540 provides input/output operations for the system 500. In some implementations, the input/output device 540 may include one or more of a network interface devices, e.g., an Ethernet card, a serial communication device, e.g., an RS-232 port, and/or a wireless interface device, e.g., an 802.11 card, a 3G wireless modem, a 4G wireless modem, or a 5G wireless modem. In some implementations, the input/output device may include driver devices configured to receive input data and send output data to other input/output devices, e.g., keyboard, printer and display devices 560. In some examples, mobile computing devices, mobile communication devices, and other devices may be used.

In some implementations, at least a portion of the approaches described above may be realized by instructions that upon execution cause one or more processing devices to carry out the processes and functions described above. Such instructions may include, for example, interpreted instructions such as script instructions, or executable code, or other instructions stored in a non-transitory computer readable medium. The storage device 530 may be implemented in a distributed way over a network, for example as a server farm or a set of widely distributed servers, or may be implemented in a single computing device.

Although an example processing system has been described in FIG. 5, embodiments of the subject matter, functional operations and processes described in this specification can be implemented in other types of digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible nonvolatile program carrier for execution by, or to control the operation of, data processing apparatus. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "system" may encompass all kinds of apparatus, devices, and machines for processing data, including by way of example a programmable processor, a computer, or multiple processors or computers. A processing system may include special purpose logic circuitry, e.g., an FPGA (field programmable gate array) or an ASIC (application specific integrated circuit). A processing system may include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a standalone program or as a module, component, subroutine, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Computers suitable for the execution of a computer program can include, by way of example, general or special purpose microprocessors or both, or any other kind of central processing unit. Generally, a central processing unit will receive instructions and data from a read-only memory or a random access memory or both. A computer generally includes a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few.

Computer readable media suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's user device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous. Other steps or stages may be provided, or steps or stages may be eliminated, from the described processes. Accordingly, other implementations are within the scope of the following claims.

Terminology

The phraseology and terminology used herein is for the purpose of description and should not be regarded as limiting.

The term "approximately", the phrase "approximately equal to", and other similar phrases, as used in the specification and the claims (e.g., "X has a value of approximately Y" or "X is approximately equal to Y"), should be understood to mean that one value (X) is within a predetermined range of another value (Y). The predetermined range may be plus or minus 20%, 10%, 5%, 3%, 1%, 0.1%, or less than 0.1%, unless otherwise indicated.

The indefinite articles "a" and "an," as used in the specification and in the claims, unless clearly indicated to the contrary, should be understood to mean "at least one." The phrase "and/or," as used in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of or "exactly one of," or, when used in the claims, "consisting of," will refer to the inclusion of exactly one element of a number or list of elements. In general, the term "or" as used shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

The use of "including," "comprising," "having," "containing," "involving," and variations thereof, is meant to encompass the items listed thereafter and additional items.

Use of ordinal terms such as "first," "second," "third," etc., in the claims to modify a claim element does not by itself connote any priority, precedence, or order of one claim element over another or the temporal order in which acts of a method are performed. Ordinal terms are used merely as labels to distinguish one claim element having a certain name from another element having a same name (but for use of the ordinal term), to distinguish the claim elements.

Having thus described several aspects of at least one embodiment of this invention, it is to be appreciated that various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

What is claimed is:

1. A method for routing a request around a network partition in a distributed database, the method comprising:

receiving, from a client device by a gateway computing device of a plurality of computing devices, a request directed to reading from or writing to a range stored by the plurality of computing devices, wherein at least three replicas of the range are stored by the plurality of computing devices, the at least three replicas being configured to participate in a consensus protocol to commit write operations to the range;

identifying, by the gateway computing device and based on the request and first leaseholder information available to the gateway computing device, a leaseholder computing device of the plurality of computing devices that is identified by the first leaseholder information as storing a leaseholder replica of the at least three replicas, the leaseholder computing device being different from the gateway computing device and being configured to (i) coordinate read operations directed to the range and (ii) coordinate the write operations directed to the range;

identifying a first network partition exists between the gateway computing device and the leaseholder computing device; and sending, in response to identifying the first network partition, the request from the gateway computing device to the leaseholder computing device via a proxy computing device of the plurality of computing devices identified by the first leaseholder information as storing a replica of the at least three replicas, wherein the leaseholder computing device is configured to (i) cause execution of the request and (ii) generate and send a response for the request to the gateway computing device via the proxy computing device when the leaseholder computing device stores the leaseholder replica.

2. The method of claim 1, wherein (i) a table comprises one or more ranges comprising the range and (ii) the range comprises key-value (KV) data.

3. The method of claim 1, wherein the gateway computing device first receives the request from the client device via one or more networks before any other computing device of the plurality of computing devices.

4. The method of claim 1, further comprising:

receiving, from the client device by the gateway computing device, a transaction comprising one or more requests comprising the request.

5. The method of claim 1, wherein each replica of the at least three replicas of the range is stored by a different computing device of the plurality of computing devices.

6. The method of claim 1, further comprising:

evaluating the request to determine the request is directed to reading from or writing to the range; and identifying, from the first leaseholder information, respective computing devices of the plurality of computing devices storing the at least three replicas of the range.

7. The method of claim 6, further comprising:

determining a closeness of each of the respective computing devices of the plurality of computing devices storing the at least three replicas of the range to the gateway computing device; and identifying, based on the first leaseholder information, the proxy computing device as being the closest of the respective computing devices storing the at least three replicas of the range to the gateway computing device.

8. The method of claim 7, wherein the closeness of each of the respective computing devices of the plurality of computing devices storing the at least three replicas of the range to the gateway computing device is defined by at least one of a geographic proximity and a latency.

9. The method of claim 1, wherein identifying the first network partition exists between the gateway computing device and the leaseholder computing device further comprises:

identifying, by the gateway computing device, the first network partition exists between the gateway computing device and the leaseholder computing device by identifying a failure to receive two or more consecutive heartbeat messages from the leaseholder computing device.

10. The method of claim 1, wherein sending the request from the gateway computing device to the leaseholder computing device via the proxy computing device further comprises:

generating and sending, by the gateway computing device in response to identifying the first network partition, a proxy request to the proxy computing device of the plurality of computing devices storing a first replica of the at least three replicas that is different from the leaseholder replica, the proxy request comprising the request and a proxy indicator identifying the leaseholder computing device, wherein the proxy computing device is configured to: receive and evaluate the proxy request by comparing the proxy indicator with second leaseholder information available to the proxy computing device, and determine, based on the comparison of the proxy indicator with the second leaseholder information, the leaseholder computing device stores the leaseholder replica.

11. The method of claim 10, wherein the proxy computing device is configured to generate and send, based on the comparison of the proxy indicator with the second leaseholder information, the request to the leaseholder computing device, wherein the leaseholder computing device is configured to (i) cause execution of the request in response to receiving the request and (ii) generate and send the response for the request to the gateway computing device via the proxy computing device in response to causing execution of the request.

12. A system for routing a request around a network partition in a distributed database, the system comprising:

a processor; and a memory storing instructions that, when executed by the processor, configure the system to perform operations comprising:

receiving, from a client device, a request directed to reading from or writing to a range stored by a plurality of computing devices, wherein at least three replicas of the range are stored by the plurality of computing devices, the at least three replicas being configured to participate in a consensus protocol to commit write operations to the range;

identifying, based on the request and first leaseholder information, a leaseholder computing device of the plurality of computing devices that is identified by the first leaseholder information as storing a leaseholder replica of the at least three replicas, the leaseholder computing device being different from the system and being configured to (i) coordinate read operations directed to the range and (ii) coordinate the write operations directed to the range;

identifying a first network partition exists between the system and the leaseholder computing device; and sending, in response to identifying the first network partition, the request to the leaseholder computing device via a proxy computing device of the plurality of computing devices identified by the first leaseholder information as storing a replica of the at least three replicas, wherein the leaseholder computing device is configured to (i) cause execution of the request and (ii) generate and send a response for the request to the system via the proxy computing device when the leaseholder computing device stores the leaseholder replica.

13. The system of claim 12, wherein the system first receives the request from the client device via one or more networks before any computing device of the plurality of computing devices, and wherein the operations further comprise:

receiving, from the client device, a transaction comprising one or more requests comprising the request.

14. The system of claim 12, wherein each replica of the at least three replicas of the range is stored by a different computing device of the plurality of computing devices.

15. The system of claim 12, wherein the operations further comprise:

evaluating the request to determine the request is directed to reading from or writing to the range; and identifying, from the first leaseholder information, respective computing devices of the plurality of computing devices storing the at least three replicas of the range.

16. The system of claim 15, wherein the operations further comprise:

determining a closeness of each of the respective computing devices of the plurality of computing devices storing the at least three replicas of the range to the system; and identifying, based on the first leaseholder information, the proxy computing device as being the closest of the respective computing devices storing the at least three replicas of the range to the system.

17. The system of claim 16, wherein the closeness of each of the respective computing devices of the plurality of computing devices storing the at least three replicas of the range to the system is defined by at least one of a geographic proximity and a latency.

18. The system of claim 12, wherein identifying the first network partition exists between the system and the leaseholder computing device further comprises:

identifying the first network partition exists between the system and the leaseholder computing device by identifying a failure to receive two or more consecutive heartbeat messages from the leaseholder computing device.

19. The system of claim 12, wherein sending the request to the leaseholder computing device via the proxy computing device further comprises:

generating and sending, in response to identifying the first network partition, a proxy request to the proxy computing device of the plurality of computing devices storing a first replica of the at least three replicas that is different from the leaseholder replica, the proxy request comprising the request and a proxy indicator identifying the leaseholder computing device, wherein the proxy computing device is configured to: receive and evaluate the proxy request by comparing the proxy indicator with second leaseholder information available to the proxy computing device, and determine, based on the comparison of the proxy indicator with the second leaseholder information, the leaseholder computing device stores the leaseholder replica.

20. The system of claim 19, wherein the proxy computing device is configured to generate and send, based on the comparison of the proxy indicator with the second leaseholder information, the request to the leaseholder computing device, wherein the leaseholder computing device is configured to (i) cause execution of the request in response to receiving the request and (ii) generate and send the response for the request to the system via the proxy computing device in response to causing execution of the request.

* * * * *